United States Patent
Koehn et al.

(10) Patent No.: US 11,279,092 B2
(45) Date of Patent: Mar. 22, 2022

(54) METHOD AND SYSTEM FOR CO-CONSOLIDATION OF THERMOPLASTIC COMPOSITE MATERIAL PARTS

(71) Applicant: The Boeing Company, Chicago, IL (US)

(72) Inventors: Joshua P. Koehn, Mukilteo, WA (US); Marc R. Matsen, Seattle, WA (US); Kirk J. Malmquist, Nine Mile Falls, WA (US); David E. Gideon, Edmonds, WA (US)

(73) Assignee: THE BOEING COMPANY, Chicago, IL (US)

( * ) Notice: Subject to any disclaimer, the term of this patent is extended or adjusted under 35 U.S.C. 154(b) by 324 days.

(21) Appl. No.: 16/358,578

(22) Filed: Mar. 19, 2019

(65) Prior Publication Data

US 2020/0298500 A1    Sep. 24, 2020

(51) Int. Cl.
| | |
|---|---|
| *B29C 33/00* | (2006.01) |
| *B29C 65/00* | (2006.01) |
| *B21D 26/00* | (2006.01) |
| *B29C 65/18* | (2006.01) |
| *B21D 26/033* | (2011.01) |
| *B29C 33/50* | (2006.01) |
| *B29K 101/12* | (2006.01) |

(52) U.S. Cl.
CPC ............ *B29C 65/18* (2013.01); *B21D 26/033* (2013.01); *B29C 33/505* (2013.01); *B29C 66/45* (2013.01); *B29K 2101/12* (2013.01)

(58) Field of Classification Search
CPC ....... B29C 33/00; B29C 33/50; B29C 33/505; B29C 65/00; B29C 65/10; B29C 65/18; B29C 66/00; B29C 66/40; B29C 66/45; B21D 26/00; B21D 26/03; B21D 26/033
See application file for complete search history.

(56) References Cited

U.S. PATENT DOCUMENTS

| | | | |
|---|---|---|---|
| 9,662,742 B2 * | 5/2017 | Matsen | ................ B21D 26/033 |
| 10,016,947 B2 * | 7/2018 | Matsen | .................... B29C 65/02 |
| 10,029,398 B2 * | 7/2018 | Matsen | ................ B21D 26/033 |
| 2015/0137427 A1 | 5/2015 | Matsen et al. | |
| 2018/0297299 A1 | 10/2018 | Caron et al. | |

FOREIGN PATENT DOCUMENTS

DE    102016210064 A1    12/2017

OTHER PUBLICATIONS

Extended European Search Report dated Jul. 2, 2020 in corresponding European Application No. 20161301.5, 9 pages.

* cited by examiner

*Primary Examiner* — Jacob T Minskey
*Assistant Examiner* — Matthew Hoover
(74) *Attorney, Agent, or Firm* — MH2 Technology Law Group LLP

(57) ABSTRACT

A co-consolidation tool, including a heating assembly to receive one or more thermoplastic parts and to apply a consolidation temperature to the one or more thermoplastic parts, a pressure bladder to apply a consolidation pressure to the one or more thermoplastic parts, and a support insert shaped and configured to support and at least partially surround at least one of the one or more thermoplastic parts, wherein at least one of heating assembly and the pressure bladder is shaped to receive and support the support insert.

20 Claims, 17 Drawing Sheets

METHOD AND SYSTEM FOR CO-CONSOLIDATION OF THERMOPLASTIC COMPOSITE MATERIAL PARTS

TECHNICAL FIELD

The present disclosure generally relates to the formation of composite structures, and more particularly, to systems and methods for the co-consolidation of thermoplastic parts into integrally formed structures.

BACKGROUND

Composite materials are strong, light-weight, materials created by combining two or more functional components which are fused (or consolidated) together. For example, a composite material may include reinforcing fibers bound in a resin matrix. Resins used in composite materials may include thermoplastic or thermoset resins. A thermoplastic composite material may become soft upon heating to a melt temperature and may harden or solidify upon cooling, and unlike a thermoset material, does not need further crosslinking to set into a final configuration.

Thermoplastic composite materials offer a number of advantages over thermoset composite materials when used in a variety of applications. These advantages may include no need for special or refrigerated storage of raw materials, no need for curing of raw materials to form a final composite part configuration, the potential for rapid processing cycles, and the ability for parts made of thermoplastic composite materials to be re-formed multiple times enabling more flexible manufacturing options.

Traditionally, parts made of thermoplastic composite materials have been joined using mechanical fasteners, adhesives, or welding. However, as larger and more complex structures are created using thermoplastic composite material parts, there is a need for new and more efficient methods to join or co-consolidate together these separate parts. Specifically, there is a need for faster and more efficient systems and methods for the co-consolidation of thermoplastic composite material parts into integrally formed structures.

BRIEF SUMMARY

This summary is intended merely to introduce a simplified summary of some aspects of one or more implementations of the present disclosure. This summary is not an extensive overview, nor is it intended to identify key or critical elements of the present teachings, nor to delineate the scope of the disclosure. Rather, its purpose is merely to present one or more concepts in simplified form as a prelude to the detailed description below.

The foregoing and/or other aspects and utilities embodied in the present disclosure may be achieved by providing a co-consolidation tool, including a heating assembly, including one or more heating surfaces, to receive one or more thermoplastic parts and to apply a consolidation temperature to the one or more thermoplastic parts; a pressure bladder, disposed within the heating assembly, to apply a consolidation pressure to the one or more thermoplastic parts; and a support insert, disposed within the heating assembly, to support at least one of the one or more thermoplastic parts, wherein at least one of the pressure bladder and the support insert is thermally conductive, wherein the support insert is shaped and configured to support and at least partially surround at least one of the one or more thermoplastic parts, and wherein at least one of the one or more heating surfaces and the pressure bladder is shaped to receive and support the support insert.

The pressure bladder may be configured to press the one or more of the thermoplastic parts together when the pressure bladder is pressurized, and the pressure bladder may be configured to press the one or more of the thermoplastic parts in contact with at least one of the one or more heating surfaces when the pressure bladder is pressurized.

The support insert may apply a compaction pressure to thermoplastic parts within the support insert when the pressure bladder is pressurized.

The foregoing and/or other aspects and utilities embodied in the present disclosure may also be achieved by providing a co-consolidation tool to form a thermoplastic fuselage skin with integrally formed thermoplastic stiffening elements, including a heating assembly, including one or more heating surfaces, to receive and apply a consolidation temperature to a thermoplastic fuselage skin and one or more thermoplastic stiffening elements; a pressure bladder, disposed within the heating assembly, to apply a consolidation pressure to the thermoplastic fuselage skin and the one or more thermoplastic stiffening elements; and a plurality of support inserts, disposed within the heating assembly, to support and at least partially surround the one or more thermoplastic stiffening elements, wherein the pressure bladder and the plurality of support inserts are thermally conductive.

The pressure bladder may be configured to press the thermoplastic fuselage skin and the one or more thermoplastic stiffening elements together when the pressure bladder is pressurized, and wherein the pressure bladder may be configured to press the thermoplastic fuselage skin and the one or more thermoplastic stiffening elements in contact with at least one of the one or more heating surfaces when the pressure bladder is pressurized.

The plurality of support inserts may apply a compaction pressure to one of the one or more thermoplastic stiffening elements within the support inserts when the pressure bladder is pressurized.

The pressure bladder may include a plurality of cavities shaped to receive and support the plurality of support inserts, and wherein, when the pressure bladder is pressurized, the plurality of support inserts apply a compaction pressure to one of the one or more thermoplastic stiffening elements contained therewithin in response to the consolidation pressure applied by the pressurized pressure bladder and physical constraints of said plurality of cavities.

When placed within the heating assembly, the pressure bladder, the plurality of thermally conductive support inserts, and the one or more thermoplastic stiffening elements, may define a support surface configured to support the thermoplastic fuselage skin within the heating assembly.

At least one of the one or more heating surfaces may include a plurality of cavities shaped to receive and support the plurality of support inserts, and wherein, when the pressure bladder is pressurized, the plurality of support inserts may apply a compaction pressure to one of the one or more thermoplastic stiffening elements contained therewithin in response to the consolidation pressure applied by the pressurized pressure bladder and physical constraints of said plurality of cavities.

When placed within the heating assembly, the plurality of thermally conductive support inserts and the one or more thermoplastic stiffening elements together with a top surface of the at least one of the one or more heating surfaces including a plurality of cavities may define a support surface configured to support the thermoplastic fuselage skin within the heating assembly.

The co-consolidation tool may further include a rotating mandrel, wherein at least one of the one or more heating surfaces is supported by the rotating mandrel.

The foregoing and/or other aspects and utilities embodied in the present disclosure may also be achieved by providing a method for consolidating thermoplastic parts, including placing a pressure bladder within a heating assembly; placing a first thermoplastic part over the pressure bladder; placing a second thermoplastic part within a support insert; placing the support insert within the heating assembly; and applying a consolidation pressure and temperature, wherein the support insert is shaped and configured to support and at least partially surround the second thermoplastic part.

The heating assembly may include one or more heating surfaces, and the pressure bladder may be configured to press the first and second thermoplastic parts in contact with at least one of the one or more heating surfaces when the consolidation pressure is applied.

The pressure bladder may be configured to press the first and second thermoplastic parts together when the consolidation pressure is applied, and the support insert may apply a compaction pressure to the second thermoplastic part when the consolidation pressure is applied.

At least one of the pressure bladder and the one or more heating surfaces may include a cavity to support and receive the support insert.

The support insert may apply a compaction pressure to the second thermoplastic part contained therewithin in response to the consolidation pressure and physical constraints of said cavity.

Placing the first thermoplastic part over the pressure bladder may include forming the first thermoplastic part over the pressure bladder.

The first thermoplastic part may be formed via at least one of automated tape laying (ATL) and automated fiber placement (AFP) processes.

The heating assembly may further include a rotating mandrel to facilitate the forming of the first thermoplastic part.

The foregoing and/or other aspects and utilities embodied in the present disclosure may also be achieved by providing a method for forming a thermoplastic fuselage skin with integrally formed thermoplastic stiffening elements, including placing a pressure bladder within a heating assembly, the heating assembly comprising one or more heating surfaces; placing a thermoplastic fuselage skin over the pressure bladder; placing a plurality of thermoplastic stiffening elements within a plurality of support inserts; placing the plurality of support inserts within the heating assembly; and applying a consolidation pressure and temperature, wherein each support insert is shaped and configured to support and at least partially surround each thermoplastic stiffening elements, wherein the pressure bladder is configured to press the thermoplastic fuselage skin and the plurality of thermoplastic stiffening elements together when the consolidation pressure is applied, wherein the pressure bladder is configured to press the thermoplastic fuselage skin and the plurality of thermoplastic stiffening elements in contact with at least one of the one or more heating surfaces when the consolidation pressure is applied, and wherein the support inserts apply a compaction pressure to the thermoplastic stiffening elements when the consolidation pressure is applied.

At least one of the pressure bladder and the one or more heating surfaces may include a plurality of cavities to support and receive the plurality of support inserts, and the support inserts may apply a compaction pressure to the thermoplastic stiffening elements contained therewithin in response to the consolidation pressure and physical constraints of said plurality of cavities.

The plurality of thermoplastic stiffening elements may be in a partially consolidated (tacked) pre-form state when placed within the plurality of support inserts, and the support inserts may apply a compaction pressure to the thermoplastic stiffening elements when the consolidation pressure is applied to fully consolidate the thermoplastic stiffening elements.

The plurality of thermoplastic stiffening elements may be discrete segments with coordinated scarf splice interfaces, and the discrete segments may be fused together along the coordinated scarf splice interfaces when the consolidation pressure is applied. Further areas of applicability will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
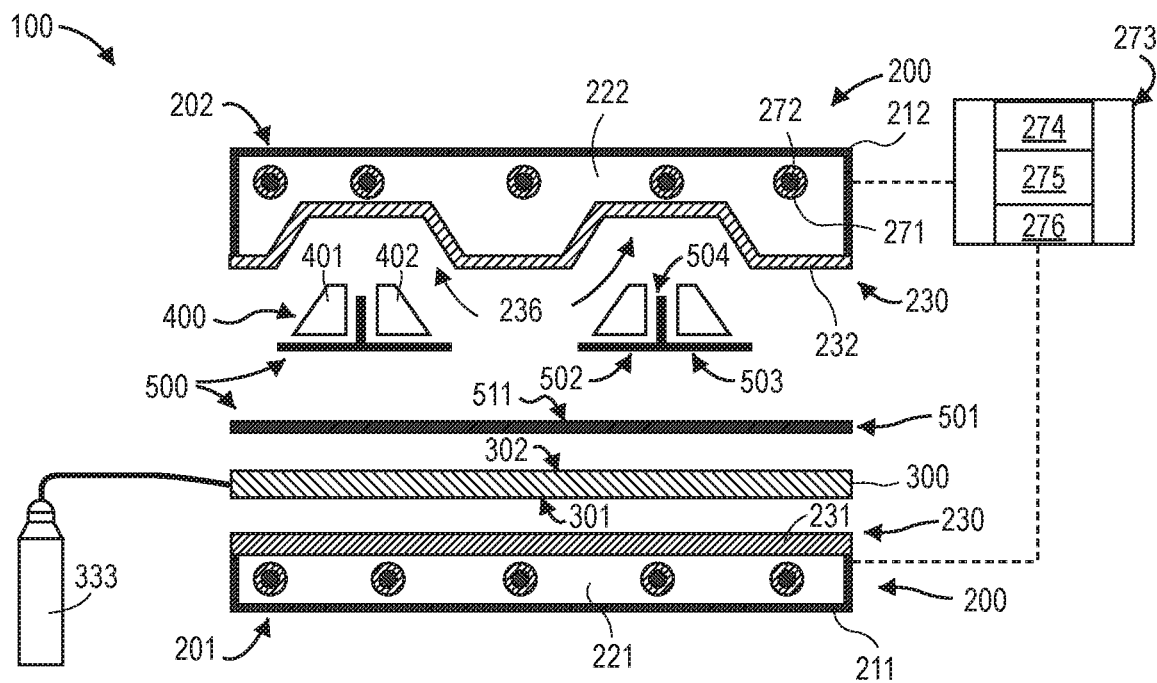
FIGS. 1-2 illustrate a tool for the co-consolidation of thermoplastic parts according to an implementation of the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally, the same reference numbers will be used throughout the drawings to refer to the same or like parts.

Thermoplastic composite materials may be used in a variety of parts and structures. For example, in the case of aircraft, thermoplastic composite materials may be used for body panels, spars, ribs, stringers, and other structures of the aircraft wing or fuselage. Similarly, thermoplastic composite material parts and structures may be used for ships, tanks, personnel carriers, train, spacecraft, satellite, submarines, automobiles, etc.

Traditionally, separate thermoplastic composite material parts may be joined together into a larger structure via mechanical fasteners, adhesives, welding, and the like. For example, mechanical fasteners may be used to attach structural ribs or stringers to a body panel.

The present inventors have developed new methods and systems to co-consolidate parts made of thermoplastic composite materials into a structure. For example, the present disclosure provides a method to co-consolidate two or more thermoplastic composite material parts into a thermoplastic composite material structure (henceforth also referred to as "thermoplastic parts" and "thermoplastic structures," respectively). The thermoplastic structure may be integrally formed. For example, the thermoplastic structure may be co-consolidated into a single integrally formed thermoplastic structure without the use of fasteners or adhesives.

As used herein, the terms "integrally formed" mean the forming of a single structure from separate parts. It may distinguish from structures formed merely from interconnected components. In some implementations, "integrally formed" describes a monolithic or unitary thermoplastic structure.

The thermoplastic composite materials of the present disclosure may include unidirectional tape thermoplastic composite materials, fabric weave thermoplastic composite materials, or a combination of both. The thermoplastic composite materials may also include thermoplastic composite slit unidirectional tape/tow which may typically be used for braiding processes, automated fiber placement processes, or the like.

The thickness of the thermoplastic composite material may be constant or varying throughout the thermoplastic part. For example, unidirectional tape thermoplastic composite material may be placed onto fabric weave thermoplastic composite material in select locations causing a thickness of the resulting thermoplastic part to vary. In other examples, a thermoplastic part may only include fabric weave thermoplastic composite materials at a constant thickness. The thermoplastic part may also include ply drops or ply additions which may cause a thickness of the thermoplastic part to vary.

The thermoplastic composite materials may include a wide variety of thermoplastic resins commonly used in the industry, including, but not limited to, thermoplastic polyetherimides (such as Ultem brand polythermides), polypropylene (PP), polypropalene, polyetherimide (PEI), polyphenylene sulfide (PPS), polyether ether ketone (PEEK), polyaryletherketone (PAEK), polyetherketoneketones (PEKK), and the reinforcement fibers may include commonly used reinforcing fibers, such as fiberglass and carbon fibers of various grades.

In some implementations, the thermoplastic parts may be hybrid thermoplastic composite material laminate including a core. The core may stiffen a structure of the hybrid thermoplastic part. The core may be a metal, such as titanium. For example, the thermoplastic part may be implemented as an Interwoven-Wire-Fabric (IWWF) or an Expanded Copper Foil (ECF). The thermoplastic part may also be implemented as a titanium core sandwiched between thermoplastic panels or as thermoplastic skin panels with a metal or stiffening core.

The thermoplastic parts may be formed using one or more composite layup processes. For example, the one or more composite layup processes may include braiding, tape layup, tow layup, and other desirable composite layup processes.

The composite layup processes may include a laser assisted fiber placement process. For example, the thermoplastic composite material may be laid down using laser-assisted fiber placement equipment. Laser-assisted fiber placement equipment may tack portions of the thermoplastic composite material using the laser as the thermoplastic composite material is laid down. By laser tacking the thermoplastic composite material, the plies of thermoplastic composite material may substantially maintain their positions relative to each other. In other implementations, tacking plies of thermoplastic composite material may also include an ultrasonic assisted method, such as typically used in some automated tape laying (ATL) processes.

Automatic and semi-automatic processes may also be used for forming thermoplastic parts under the present disclosure. For example, automated tape laying (ATL) and automated fiber placement (AFP) processes may be used to lay one or several layers of tape or tows onto a mold to create a thermoplastic part.

Once formed, one or more thermoplastic parts may be co-consolidated into a thermoplastic structure using the co-consolidation tool of the present disclosure.

In some implementations, the thermoplastic parts may be fully consolidated before placing within the co-consolidation tool. In other implementations, the thermoplastic parts may be partially consolidated before placing within the co-consolidation tool. In yet other implementations, the thermoplastic part may be a prepeg or a pre-from before placing within the co-consolidation. As used herein, the term "prepeg" refers to a ready to process part including unidirectional fiber impregnated with resin. "Prepeg" may also refer to a single ply of thermoplastic material. As used herein, the term "preform" refers to a pre-shaped thermoplastic composite material lay-up formed to the desired shape before being fully consolidated.

As used herein, the terms "partially consolidated" refers to a thermoplastic part with a higher porosity level as compared to consolidated thermoplastic part. In some implementations, the porosity level of a partially consolidated or preform thermoplastic part exceeds the porosity levels quality standard for a finished thermoplastic part.

The thermoplastic parts may include thermoplastic body panels or skins. For example, the thermoplastic parts may include full barrel, half-barrel, or smaller panel segment thermoplastic parts used for aircraft fuselage.

The thermoplastic skin may be formed using a full barrel layup to a contoured rotating mandrel. The thermoplastic skin may be formed via partial layup consolidation using automated fiber placement (AFP) with laser assisted tacking or automated tape layup (ATL) with ultrasonic assisted tacking. The mandrel surface may be smooth and emulate a normalized fuselage or body cross-section with no coordinated recess features for skin ply pad-ups, stringers, or other stiffening elements. The thermoplastic skin may be formed as a full body barrel, and may be trimmed into halves or smaller skin sections for co-consolidation into a larger thermoplastic structure as described further below.

The thermoplastic skin may also be formed using a flat skin panel layup rolled to a fuselage or body contour. The thermoplastic skin may be formed via partial layup consolidation using AFP with laser assisted tacking or ATL with ultrasonic assisted tacking. For example, the thermoplastic skin panel may be placed on a flat tool surface, with the external thermoplastic ply being the first ply placed on the bottom against the tool surface. Once the layup is completed, the flat skin panel may be moved through an infrared heater at over 700° F. or contacted with an alternate heating apparatus (e.g. bladder, blanket, roller, etc.) to pre-condition for forming to a fuselage or body contour. For example, the pre-heated skin panel may be secured to a mandrel that rotates 180° to form a half barrel skin panel as it is being pulled around the smooth contoured mandrel surface. Alternatively, the forming process may include draping the pre-heated skin panel in a controlled manner over a contoured mandrel surface. Once formed, the contoured thermoplastic skin may be ready for co-consolidation with other thermoplastic parts as described below.

The thermoplastic skin may also be formed using a laminate stackup of discrete pre-formed and pre-consolidated partial skin layups to be co-consolidated. That is, a thermoplastic skin may be formed of discrete thermoplastic sub-parts to be co-consolidated into a thermoplastic structure once within the co-consolidation tool described below. For example, full acreage thermoplastic ply sequences may be pre-consolidated and pre-formed to a contour, consisting of either unidirectional (UD) thermoplastic tape or fabric thermoplastic. Partial mid-laminate ply sequences at padups may be pre-consolidated into discrete "doubler kits," such as door surrounds, windowbelts, etc. Each doubler layup kit may then be partially pre-consolidated using AFP with laser assisted tacking or ATL with ultrasonic assisted tacking. Each full acreage ply and partial doubler ply kit is then assembled into the co-consolidation tool described below and then co-consolidated into a single thermoplastic structure. Additional thermoplastic parts may be added to the co-consolidation tool, in addition to the thermoplastic skin, to be included in the resulting thermoplastic structure.

For larger bodies, the thermoplastic skin may also be formed using smaller, more manageable thermoplastic skin pieces or "gores." Each gore may be partially pre-consolidated using AFP with laser assisted tacking or ATL with ultrasonic assisted tacking. Each gore may be pre-contoured. The layup of the gores may be staggered to enable coordinated scarf splicing with the adjacent gore panels. The gores may be directly placed within the co-consolidation tool in a coordinated fashion to enable overlapping scarf splices to fuse into a panel after co-consolidation. In some implementations, each gore may contain the full desired layup ply thickness stackup, including any local ply drop and add features. In other implementations, each gore may contain only a portion of the desired layup ply thickness stackup, as each gore may be overlapped with other partial thickness gores or a full panel acreage ply (similar as mentioned above) to fuse together the desired integral panel stackup thickness after co-consolidating per the process described below.

The thermoplastic parts may include thermoplastic stringers or other stiffening elements (e.g. stiffener, shear-tie, frame, rib, etc.). For example, as described below, one or more thermoplastic stringers or stiffening elements may be placed within the co-consolidation tool together with a thermoplastic skin to form a co-consolidated thermoplastic structure. The co-consolidated thermoplastic structure may be a thermoplastic body panel with integrally formed stiffening elements.

The thermoplastic stringers (or other stiffening element) may be formed by heating and stamp forming a thermoplastic composite material into an intended profile shape (e.g. hat, Z, C, L, etc.). In some implementations, the thermoplastic composite material is fully consolidated prior to this stamp forming process. In other implementations, the thermoplastic stringer may be in a partially consolidated state from tacking or braiding the thermoplastic laminates, and would rely on a secondary consolidation process to be fully consolidated. Both processes may create fully pre-consolidated thermoplastic stringer segments in an acceptable preform shape and thickness ready for co-consolidation with other thermoplastic parts as described below.

The thermoplastic stringers (or other stiffening elements) may be formed by heating and stamp forming a thermoplastic composite material into an intended profile shape. The thermoplastic stringer may be in a partially consolidated state from tacking or braiding the thermoplastic laminates, and would rely on secondary co-consolidation, as described below, to provide enough consolidation pressure for full stringer consolidation and/or full co-consolidation with other thermoplastic parts. In some implementations, partial length thermoplastic stringers may be placed in the co-consolidation tool to be co-consolidated into full length stringers concurrently as the thermoplastic stringers are co-consolidated with other thermoplastic parts into a single thermoplastic structure.

In some implementations, longer stringer spans and/or highly contoured stringers (or other stiffening elements) may benefit from partitioning into shorter stringer segments with coordinated staggered ply layups. For example, thermoplastic stringer segments (or subparts) or stiffening element segments (or sub-elements) may be placed within the co-consolidation tool (descried below) in a coordinated fashion for scarf splicing the stringer segments together during the co-consolidation process, and/or during the co-consolidation of the thermoplastic stringers (or stringer segments) with a thermoplastic skin or other thermoplastic parts into an integrally formed thermoplastic structure.

The partial length stringer segments may be in either a fully pre-consolidated state or partially consolidated state (tacked) and pre-formed into a desired stringer profile (e.g. hat, Z, C, L, etc.) before loading into the co-consolidation tool.

While thermoplastic skin panels and thermoplastic stringers or stiffening elements are described above as exemplary thermoplastic parts, the present disclosure is not limited thereto, and other types of thermoplastic parts may be used. For example, the thermoplastic parts to be co-consolidated may include stringers, stiffeners, shear-ties, frames, ribs, spars, fittings, brackets, fuselage stiffening elements, wing elements such as wing blades and wing edges, empennage, engine nacelles, flight control surfaces, automobile assemblies, medical devices, sporting goods, etc.

Similarly, while various methods for making the thermoplastic parts are described above, the present disclosure is not limited thereto, and other methods for making the thermoplastic parts may be used. For example, the thermoplastic parts may be formed via a contour tape laminating machine (CTLM).

Figure 2:
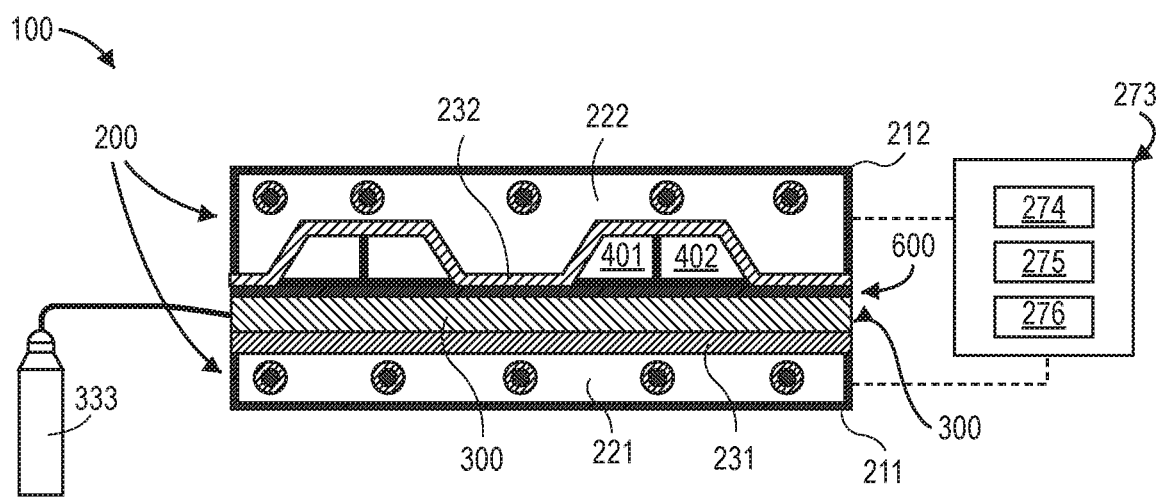

FIGS. 1-2 illustrate a tool for the co-consolidation of thermoplastic parts according to an implementation of the present disclosure. FIG. 1 illustrates a co-consolidation tool 100 in an open position. FIG. 2 illustrates the co-consolidation tool 100 of FIG. 1 in a closed position. As illustrated in FIGS. 1-2, a co-consolidation tool 100 may include a heating assembly 200, a pressure bladder 300, and a support insert 400. The support insert may be configured as a plurality of support inserts 400, and/or each support insert 400 may comprise one or more complementary support inserts 401 and 402.

Co-consolidation tool 100 is configured to consolidate one or more thermoplastic parts 500 into a thermoplastic structure 600. Thermoplastic structure 600 may be integrally formed. As used herein, co-consolidation may include applying a consolidation temperature, a consolidation pressure, and/or applying a consolidation temperature and consolidation pressure to one or more thermoplastic parts such that the resin in at least a portion of the thermoplastics parts flow. As the resin flows, resin in separate thermoplastic parts may flow together at the boundary between the separate thermoplastic parts. As the thermoplastic parts are cooled, the resin solidifies. As the resin that flows between separate thermoplastic parts solidifies, separate thermoplastic parts may be integrally formed into one thermoplastic structure.

In some implementations, the orientation of the reinforcement fibers is optimized for higher quality parts. For example, the lay-up processes described above to create the thermoplastic parts 500 may create specific fiber paths optimized for the desired performance of the thermoplastic part 500. These fiber orientations may be maintained by the "tacked" or "partially consolidated" nature of the thermoplastic part 500 during their forming process. In some implementations, very little material flow is needed to consolidate the thermoplastic parts 500 and the resulting consolidated thermoplastic structure 600 will have precisely controlled fiber orientation. In some implementations, the co-consolidation process eliminates the voids (or increased porosity or bulk) in the configured lay-ups. If the thermoplastic parts 500 are fully consolidated, then a purpose of the co-consolidation process is to join them together into a thermoplastic structure 600. Alternatively, the co-consolidation tool 100 may be used to fully consolidate the thermoplastic parts 500 and join the thermoplastic parts 500 into thermoplastic structure 600 during the co-consolidation process.

In some implementations, the co-consolidation tool 100 allows for the simultaneous consolidation of all thermoplastic parts 500 forming the integrally formed thermoplastic structure 600. For example, a full consolidation process may be performed in the co-consolidation tool, eliminating the need for several initial consolidation cycles for each of the structural component inputs (i.e. separate thermoplastic parts 500) or the subsequent joining step for the separately consolidated thermoplastic parts 500 (using mechanical fasteners, adhesives, welding, or the like).

In some implementations, the one or more thermoplastic parts 500 may be co-consolidated into a thermoplastic structure 600 by subjecting them to a combination of a consolidation temperature and consolidation pressure according to a predetermined schedule specifying applied pressures, temperatures, and durations for which said pressures and temperatures are maintained. These schedule consolidation temperatures and pressures are sometimes referred to as the consolidation temperate profile and the consolidation pressure profile. Accordingly, the consolidation temperature and the consolidation pressure may vary as a function of time during the co-consolidation process. In other implementations, the consolidation temperature corresponds to a temperature along the consolidation temperature profile and the consolidation pressure corresponds to a pressure along the consolidation pressure profile.

The consolidation temperature may be from about 350° F. to about 820° F. In other implementations, the consolidation temperature may be from about 600° F. to about 800° F. In some implementations, the consolidation temperature may be above a melting temperature of the thermoplastic part. As a result, at the maximum consolidation temperature, the resin of the thermoplastic part is melted and flows. For example, a maximum consolidation temperature may be about 820° F., about 800° F., about 780° F., about 770° F., about 760° F., about 750° F., about 740° F., about 730° F., about 720° F., and/or about 710° F. for aerospace applications, depending on the resin being used. The maximum consolidation temperature may be applied for a predetermined period during application of the consolidation temperature, for example, the maximum consolidation pressure may be applied for about 5 minutes, about 10 minutes, and/or up to 5 minutes, and up to 10 minutes.

The consolidation pressure may be 300 psi or less, 250 psi or less, or 200 psi or less. For example, the consolidation pressure may be from about atmospheric pressure to about 300 psi, from about 100 psi to about 250 psi, or from about 150 psi to about 225 psi, and/or about 200 psi.

The heating assembly 200 may be configured to receive one or more thermoplastic parts 500 and to apply a consolidation temperature to the thermoplastic parts 500. The heating assembly 200 may include one or more heating assemblies 200. For example, as illustrated in FIGS. 1-2, the heating assembly 200 may include a bottom heating assembly 201 and a top heating assembly 202.

The heating assembly 200 may include one or more structural elements 210 to provide structural support to the heating assembly 200. The one or more structural elements 210 may include a material that is inert to a magnetic field. For example, the one or more structural elements 210 may include non-magnetic stainless steel, and the one or more structural elements 210 may be embodied as inert steel structural frames 210. For example, as illustrated in FIGS. 1-2, the bottom heating assembly 201 may include a bottom structural element 211, and the top heating assembly 202 may include a top structural element 212.

The heating assembly 200 may include one or more heating bodies 220. The one or more heating bodies 220 may include an inert (or non-magnetic) ceramic cast body with embedded induction coils 271 and coolant channels 272 to generate a magnetic field for induction heating. For example, as illustrated in FIGS. 1-2, the bottom heating assembly 201 may include a bottom heating body 221, and the top heating assembly 202 may include a top heating body 222.

The heating assembly 200 may include a plurality of induction coils 271 and coolant channels 272. The induction coils 271 and coolant channels 272 may be connected to controller 273, power supply 274, coolant supply 275, and sensor 276 configured to control the heat-up and cool-down cycles for the co-consolidation tool 100. The controller 273 may be configured to control the input power fed to the induction coils 271 by the power supply 274. By controlling the input power, controller 273 controls the magnetic field produced by induction coils 271 and the temperature of the heating assembly 200.

The induction coils 271 and coolant channels 272 may allow for faster thermal cycles for the co-consolidation tool 100. For example, a cooling medium within the coolant channels 272 may be circulated to increase a cooling rate of the heating assembly 200 and/or the one or more thermoplastic parts 500 supported within. Faster heat up rates for the heating assembly 200 may be achieve due to significant reduction in the overall heated mass.

The heating assembly 200 may include one or more heating surfaces 230 to generate heat and/or to provide heat to the thermoplastic parts 500. The one or more heating surfaces 230 may include a smart susceptor to generate heat according to the magnetic field generated by the one or more heating bodies 220. For example, as illustrated in FIGS. 1-2, the bottom heating assembly 201 may include a bottom heating surface 231, and the top heating assembly 202 may include a top heating surface 232.

As used herein, the terms "smart susceptor" refers to ferromagnetic materials and allows which are heated via induction coils, wherein the smart susceptor controls the temperature by their intrinsic magnetic properties. In particular, the change from a magnetic to a non-magnetic state as the Curie point is reached. While not bound to any particular theory, it is believed that once a section of the smart susceptor is heated to the leveling temperature, it becomes nonmagnetic, and it automatically becomes the less preferred path for the magnetic flux to reside, preventing the smart susceptor from heating beyond its Curie point. This automatically directs heating to the cooler areas of the smart susceptor that are still ferromagnetic. This process continues until all of the smart susceptor is at the Curie point. In some implementations, the material of the heating surfaces 230, or of the smart susceptor within, is selected according to a desired co-consolidation temperature.

In some implementations, at least one of the one or more heating bodies 220 and/or the one or more heating surfaces 230 may include a contoured surface configured to accommodate the support insert 400. For example, as illustrated in FIGS. 1-2, top heating surface 232 may include cavities 236 configured to receive the support insert 400.

The pressure bladder 300 may be disposed within the heating assembly 200, and may be configured to apply a consolidation pressure to the thermoplastic parts 500. For example, the pressure bladder 300 may be a pneumatic pressure bladder. The pressure bladder 300 may be connected to a pressure source 333 and configured to provide a consolidation pressure of up to 300 psi, up to 250 psi, up to 225 psi, up to 210 psi, and/or up to 200 psi.

The pressure bladder 300 may include a material having one or more of the following desirable characteristics: an ability to hold pressure, thermal stability, flexibility, conformity, and desirable thermal expansion characteristics.

For example, during co-consolidation, the pressure bladder 300 may be pressurized to apply a consolidation pressure to one or more thermoplastic parts 500. The consolidation pressure applied by the pressure bladder 300 may be a compressive force. For example, the pressure bladder 300 may be configured to press the thermoplastic parts 500 together when the pressure bladder 300 is pressurized. The pressure bladder 300 may also be configured to press the thermoplastic parts 500 in contact with the heating surfaces 230 when the pressure bladder is pressurized.

It may also be desirable for the pressure bladder 300 to be thermally stable at a co-consolidation temperature of up to 750° F., up to 740° F., up to 730° F., up to 720° F., and/or up to 710° F.

In other implementations, the thermal expansion characteristics of the pressure bladder 300 allow for removal of pressure bladder 300 following co-consolidation. For example, the pressure bladder may contract as it cools, facilitating removal of the thermoplastic parts 500 and/or the pressure bladder 300.

In some implementations, the pressure bladder 300 is thermally conductive and is configured to transmit a heat generated by the heating assembly 200 to the one or more thermoplastic parts 500.

Additionally, it may be desirable for the pressure bladder 300 to be flexible to provide an even distribution of the consolidation pressure. In some implementations, the pressure bladder 300 becomes flexible as it approaches the consolidation temperature, allowing the pressure bladder 300 to more closely conform to the shape of the one or more thermoplastic parts 500 and/or the desired thermoplastic structure 600. In addition, to better co-consolidate the one or more thermoplastic parts 500, it may also be desirable for the pressure bladder 300 to have a shape substantially similar or corresponding to a shape of the thermoplastic structure 600 to be consolidated.

In some implementations, the pressure bladder 300 includes at least one surface 301 configured to conform to and contact a heating surface 230 of the heating assembly 200. The pressure bladder 300 may also at least one surface 302 configured to support one or more thermoplastic parts 500. For example, as illustrated in FIGS. 1-2, surface 301 is configured to contact bottom heating surface 231 and surface 302 is configured to contact first thermoplastic part 501.

In other implementations, the pressure bladder 300 includes at least one surface 302 (see FIGS. 5-7) contoured to accommodate the support insert 400. For example, the support insert 400 may be shaped and configured to at least partially surround and support at least one of the thermoplastic parts 500, and at least one surface of the pressure bladder 300 may be contoured to have one or more cavities 336 configured to receive the support insert 400 (See FIGS. 5-7).

The pressure bladder 300 may be formed of or include aluminum or an aluminum alloy. The pressure bladder 300 may also be formed of or include magnesium or a magnesium alloy.

The pressure bladder 300 may be a metallic pressure bladder comprising one or more metallic sheets. For example, the pressure bladder 300 may be formed of or include aluminum or an aluminum alloy. The pressure bladder 300 may also be formed of or include magnesium or a magnesium alloy.

The support insert 400, may be disposed within the heating assembly 200, and may be configured to support and at least partially surround at least one of the thermoplastic parts 500.

The support insert 400 may be formed of or include a thermally conductive material or alloy and may allow the transmission of heat from the heating assembly 200 to the one or more thermoplastic parts 500. The support insert 400 may be non-magnetic and/or inert with respect to the magnetic fields generated by the heating assembly. The support insert 400 may be a solid support insert. For example, the support insert 400 may be formed of or include aluminum and/or aluminum alloys.

The support insert 400 may be shaped and configured to at least partially surround and support at least one of the one or more thermoplastic parts 500 during a consolidation process. For example, as illustrated in FIGS. 1-2, each support insert 400 may be formed of complementary support inserts 401 and 402 configured to fit within concave areas of stiffening elements 502. For example, the stiffening elements 502 may be embodied as T-shaped thermoplastic parts 502. Each pair of complementary support inserts 401 and 402 may at least partially surround and support the T-shaped thermoplastic part 502. In some implementations, at least a portion of each thermoplastic part 500 within the support insert 400 is left free to contact other thermoplastic parts, the pressure bladder 300, and/or the heating surfaces 230. For example, as illustrated in FIGS. 1-2, a bottom surface 503 of each T-shaped thermoplastic parts 502 is left uncovered by the complementary support inserts 401 and 402 so that it can contact a contact surface 511 of a thermoplastic panel 501. Similarly, in certain implementations, at least a portion of each thermoplastic part 500 within the support insert 400 is left free to contact the one or more heating surfaces 230. For example, as illustrated in FIGS. 1-2, a top surface 504 of each T-shaped thermoplastic parts 502 is left uncovered by the complementary support inserts 401 and 402 so that it can contact the top heating surface 232. The support insert 400 may protect the thermoplastic part 500 from deformation during a co-consolidation operation. For example, as illustrated in FIGS. 1-2, complementary support inserts 401 and 402 may protect a shape of the T-shaped thermoplastic part 502 during co-consolidation. Complementary support inserts 401 and 402 may prevent a force, such as a consolidation pressure, applied to the T-shaped thermoplastic part 502 from crushing the shape of T-shaped thermoplastic part 502 during co-consolidation.

In other implementations, the support insert 400 may aid in providing a uniform consolidation pressure to the thermoplastic part 500 supported within. For example, complementary support inserts 401 and 402 may even out a consolidation pressure applied by the pressure bladder 300 to the T-shaped thermoplastic part 502 during co-consolidation. In addition, complementary support inserts 401 and 402 may also provide a lateral compaction pressure to the T-shaped thermoplastic part 502 during co-consolidation in response to the consolidation pressure applied by the pressure bladder 300 and/or the physical constraints by the cavity 236.

In some implementations, each support insert 400 supporting a thermoplastic part 500 is placed within a cavity 236 of a contoured heating surface 230 configured to receive the support insert 400. In other implementations, each support insert 400 supporting a thermoplastic part 500 is placed within a cavity 336 of a contoured pressure bladder 300 configured to receive the support insert 400 (see FIGS. 5-7). The support insert 400 may provide a compaction pressure to the thermoplastic part 500 contained therein in response to a consolidation pressure applied by the pressure bladder 300 and/or the physical constraints of the cavity 236 or 336.

Figure 4:
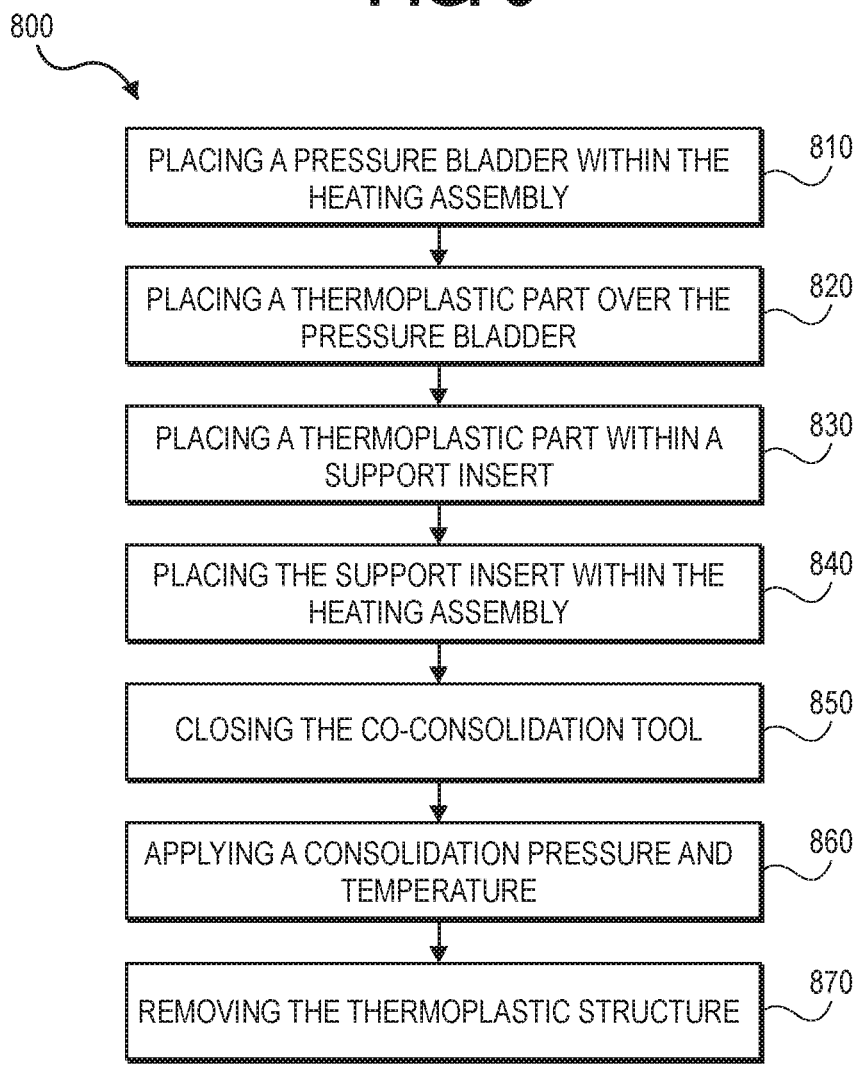
FIG. 4 illustrates a method for the co-consolidation of thermoplastic parts according to an implementation of the present disclosure.

FIG. 4 illustrates a method for the co-consolidation of thermoplastic parts according to an implementation of the present disclosure. As illustrated in FIG. 4, a method 800 for the co-consolidation of thermoplastic parts may be described with respect to the co-consolidation tool 100 of FIGS. 1-2.

The method 800 may begin with placing a pressure bladder 300 within the heating assembly 200 in operation 810. For example, as illustrated in FIGS. 1-2, a pressure bladder 300 may be placed over a bottom heating surface 231 of the bottom heating assembly 201.

A thermoplastic part 500 may be placed (or formed) over the pressure bladder 300 in operation 820. The thermoplastic part 500 may be fully consolidated when placed on the pressure bladder 300. Alternatively, the thermoplastic part 500 may be partially-consolidated or may be a preformed thermoplastic part 500 when placed on the pressure bladder 300. Thermoplastic part 500 may be a collection of thermoplastic subparts to be fully consolidated in the co-consolidation tool 100. In some implementations, the thermoplastic part 500 may be formed directly on the pressure bladder 300. The thermoplastic part 500 may be formed on the pressure bladder 300 via AFP, ATL, or via the other thermoplastic (or similar) forming methods described above. For example, as illustrated in FIGS. 1-2, a first thermoplastic part 501 may be embodied as a thermoplastic skin 501 placed or formed over a top surface 302 the pressure bladder 300.

In operation 830, a thermoplastic part 500 may be placed within and/or supported by the support insert 400. For example, a second thermoplastic part 502 may be embodied as a thermoplastic T-shaped stringer 502. A support insert 400 may include complementary support inserts 401 and 402. The complementary support inserts 401 and 402 may be placed within concave areas of a T-shaped thermoplastic stringer 502. In one implementation, the support insert 400 may leave a bottom surface 503 of the second thermoplastic part 502 open to contact a contact surface 511 of the first thermoplastic part 501. In some implementations, the support insert 400 may leave a top surface 504 of the second thermoplastic part 502 open to contact a top heating surface 232.

The support insert 400, supporting and surrounding the second thermoplastic part 502, is placed within the heating assembly 200 in operation 840. For example, as illustrated in FIGS. 1-2, the second thermoplastic part 502 may be partially surrounded and supported by complementary support inserts 401 and 402 of the support insert 400, and this assembly may be placed over the first thermoplastic part 501 that was placed (or formed) over the pressure bladder 300. In some implementations, at least a bottom surface 503 of the second thermoplastic part 502 directly contacts a contact surface 511 of the first thermoplastic part 501. The placement of the support insert 400, supporting and surrounding the second thermoplastic part 502, may correspond to a cavity 236 of a contoured top heating surface 232, such that, when the co-consolidation tool 100 is in a closed position and/or the pressure bladder 300 is pressurized, the support insert 400 applies a lateral compaction pressure to the second thermoplastic part 502.

In operation 850, the co-consolidation tool 100 is closed to allow the heating assembly 200 to heat the thermoplastic parts 500. For example, as illustrated in FIGS. 1-2, the co-consolidation tool 100 may be brought to a closed position to place the top heating surface 232 in contact with (or in position to contact) the support insert 400, supporting and surrounding the second thermoplastic part 502, and at least a portion of the first thermoplastic part 501. In some implementations, the pressure bladder 300 must be pressurized to bring the top heating surface 232 in contact with the support insert 400, supporting and surrounding the second thermoplastic part 502, and at least a portion of the first thermoplastic part 501. In other implementations, closing the co-consolidation tool 100 brings the top heating surface 232 in contact with the support insert 400, supporting and surrounding the second thermoplastic part 502, and at least a portion of the first thermoplastic part 501. For example, the pressure bladder 300 may be pressurized before closing of the co-consolidation tool 100 to ensure contact by the top heating surface 232.

In operation 860, a consolidation pressure and temperature is applied to the thermoplastic parts 500. For example, a controller 273 may control the power supplied to the heating assembly 200 to control the heat generated by the heating assembly 200. Similarly, controller 273 may control coolant supplied to the heating assembly 200 to control cooling of the heating assembly 200.

In one implementation, bottom heating surface 231 and top heating surface 232 generate a heat in response to the magnetic fields generated by the induction coils 271. In some implementations, bottom heating surface 231 and top heating surface 232 include smart susceptors configured to limit the application of heat to localized areas adjacent to the thermoplastic parts 500. In some implementations, a cooling medium circulated within the coolant channels 272 is used to increase a cooling rate of the heating assembly 200 and/or the thermoplastic parts 500 within.

Figure 3:
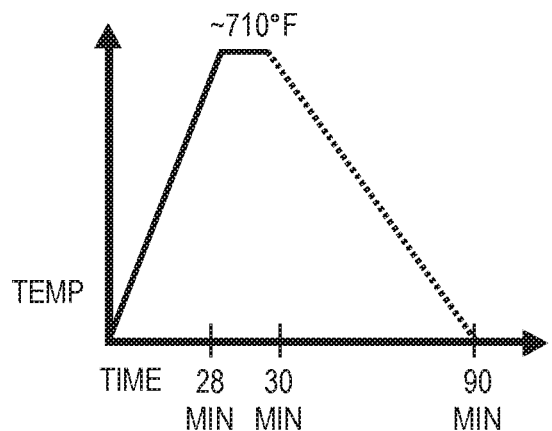
FIG. 3 illustrates a consolidation temperature according to an implementation of the present disclosure.

FIG. 3 illustrates a consolidation temperature according to an implementation of the present disclosure. As illustrated in FIG. 3, the consolidation temperature applied by the heating assembly 200 may vary as a function in time. In some implementations, the use of smart susceptors and cooling channels allows for the rapid heat-up and cool-down of the heating assembly. For example, as illustrated in FIG. 3, the maximum consolidation temperature may be reached within 30 minutes of starting the co-consolidation process, and a cool-down temperature may be reached within 90 minutes of starting the co-consolidation process. In one implementation, as illustrated in FIG. 3, the maximum consolidation temperature is about 710° F. In other implementations, the maximum consolidation temperature may be up to 750° F., up to 740° F., up to 730° F., up to 720° F., and/or up to 710° F.

As used herein, the cool-down temperature refers to the temperature at which the fully co-consolidated thermoplastic structure may be removed from the co-consolidation tool 100.

In some implementations, the cool-down temperature is about 150 F or less. In other implementations, the cool-down temperature is below the glass transition temperature.

The maximum consolidation temperature may be reached within 60 minutes, within 55 minutes, within 50 minutes, within 45 minutes, within 40 minutes, within 35 minutes, within 25 minutes, within 20 minutes, and within less than 20 minutes of starting the co-consolidation process.

The cool-down temperature may be reached within 120 minutes, within 110 minutes, within 100 minutes, within 80 minutes, within 70 minutes, within 60 minutes, within 50 minutes, within 40 minutes, and within less than 40 minutes of starting the co-consolidation process.

In some implementations, the pressure bladder 300 is a pneumatic pressure bladder 300, and a pressure source 333 is used to pressurize the pressure bladder 300. The pressurized pressure bladder 300 can then apply a consolidation pressure to the thermoplastic parts 500 during the co-consolidation operation.

In some implementations, the controller 273 may also control the pressure source 333 and the pressurization of the pressure bladder 300.

As the thermoplastic parts 500 are heated and compressed according to the consolidation temperature and the consolidation pressure, the thermoplastic parts 500 may be consolidated into a thermoplastic structure 600.

In operation 870, thermoplastic structure 600 is removed from the co-consolidation tool 100. For example, co-consolidation tool 100 may be opened after the thermoplastic structure 600 reaches the desired cool-down temperature and the thermoplastic structure 600 is removed. The complementary support inserts 401 and 402 are then removed from around the T-shaped stringers of the thermoplastic structure 600.

The pressure bladder 300 may be de-pressurized before opening the co-consolidation tool 100 to help removal of the thermoplastic structure 600. For example, a vacuum may be applied to the pressure bladder 300 to release the thermoplastic structure 600 from the heating assembly 200.

While FIGS. 1-4 describe the present disclosure in terms of a co-consolidation tool configured to accommodate generally planar thermoplastic skins and T-shaped stringers, the present disclosure is not limited thereto. The co-consolidation tool of the present disclosure may be configured to accommodate many other types of thermoplastic parts and thermoplastic structures, whether flat or contoured. For example, as illustrated in FIGS. 5-18, the co-consolidation tool 100 may be configured to produce thermoplastic structures 600 embodied as full-barrel (FIG. 18) or half-barrel (FIG. 9) thermoplastic fuselage skins or other panels integrally formed with one or more thermoplastic stringers or stiffening elements.

Generally, the same reference numbers are used for same or similar structures, and the description of the components with respect to FIGS. 1-4 may also apply to the implementations illustrated in FIGS. 5-18. It should be appreciated by those skilled in the art that the implementations illustrated in FIGS. 15-18 represent changes that may be made to the present disclosure without departing from the principles and spirit of generally contained in this detailed description.

Figure 5:
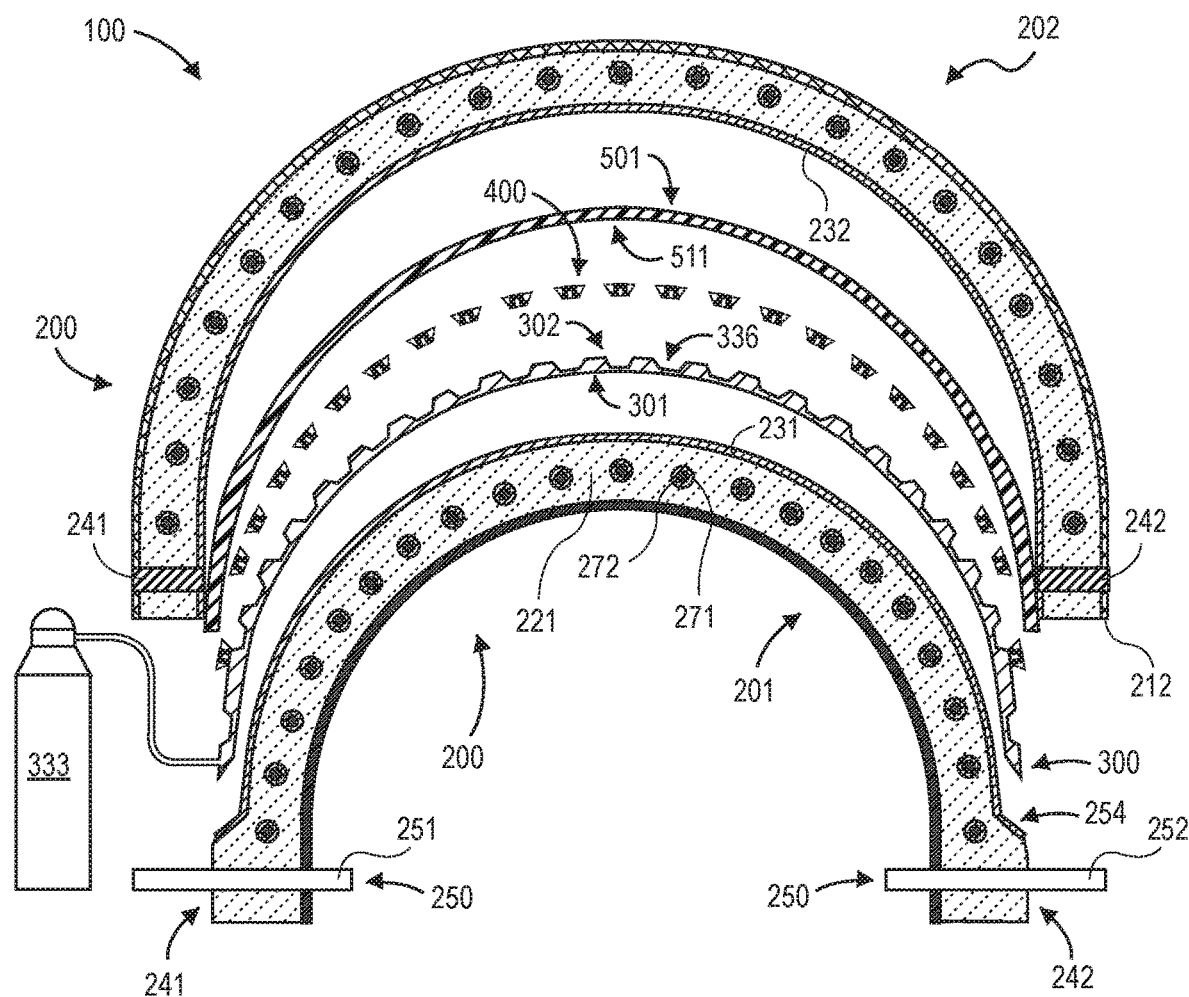
FIGS. 5-7 illustrate a tool for the co-consolidation of thermoplastic parts according to an implementation of the present disclosure.
Figure 6:
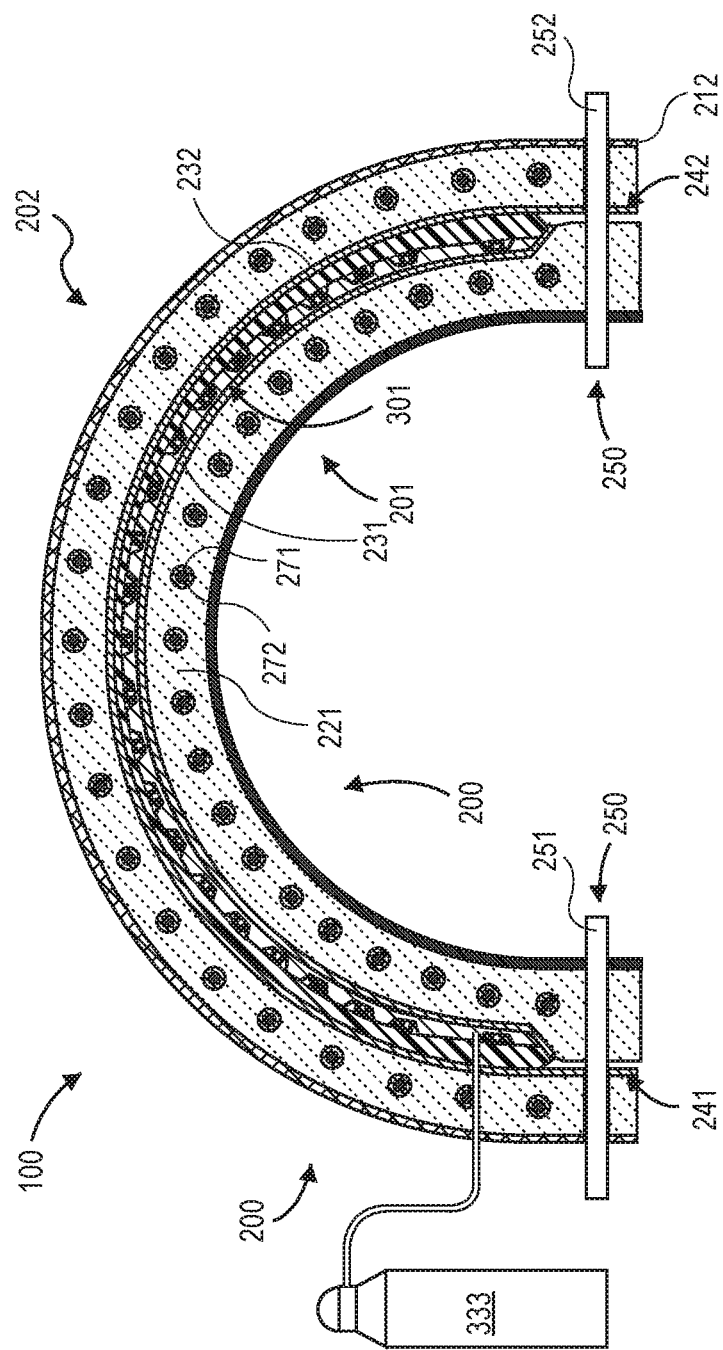
Figure 7:
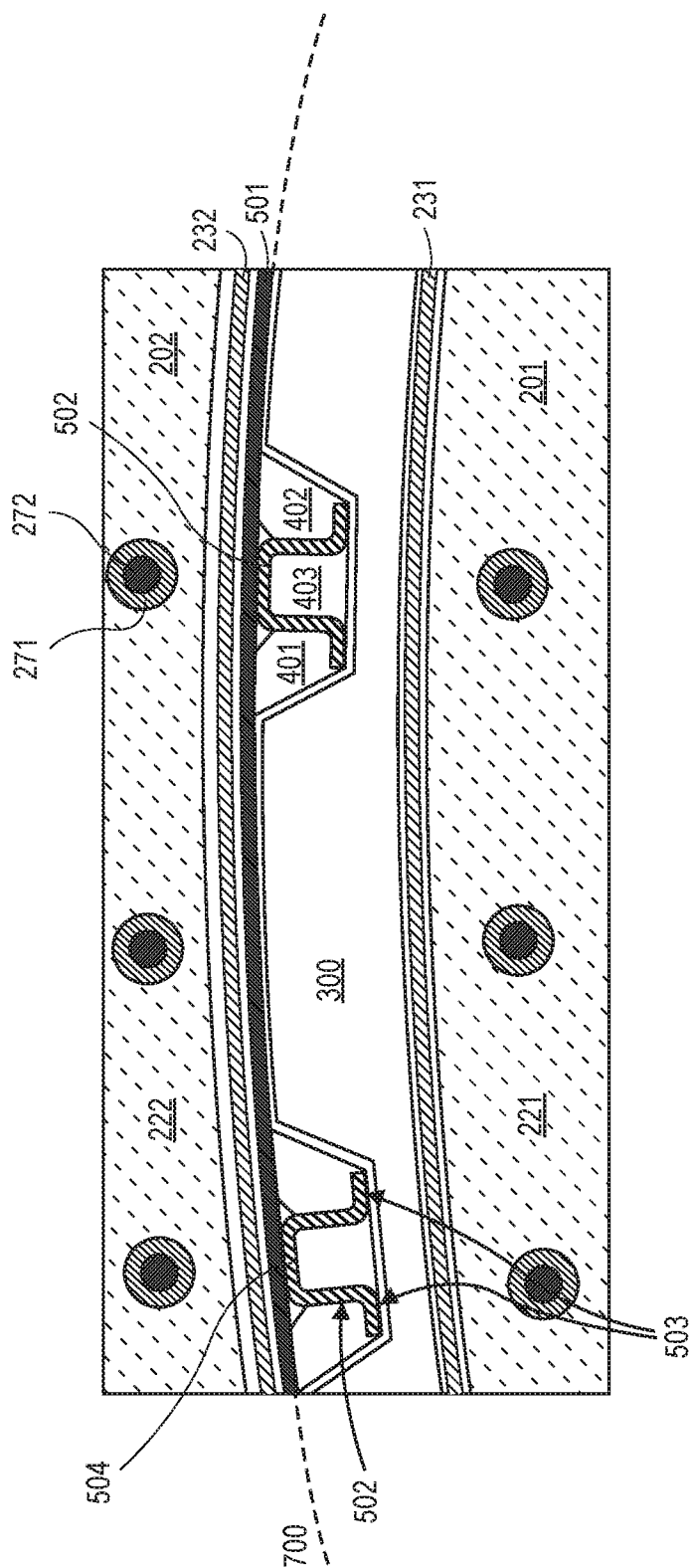
Figure 8:
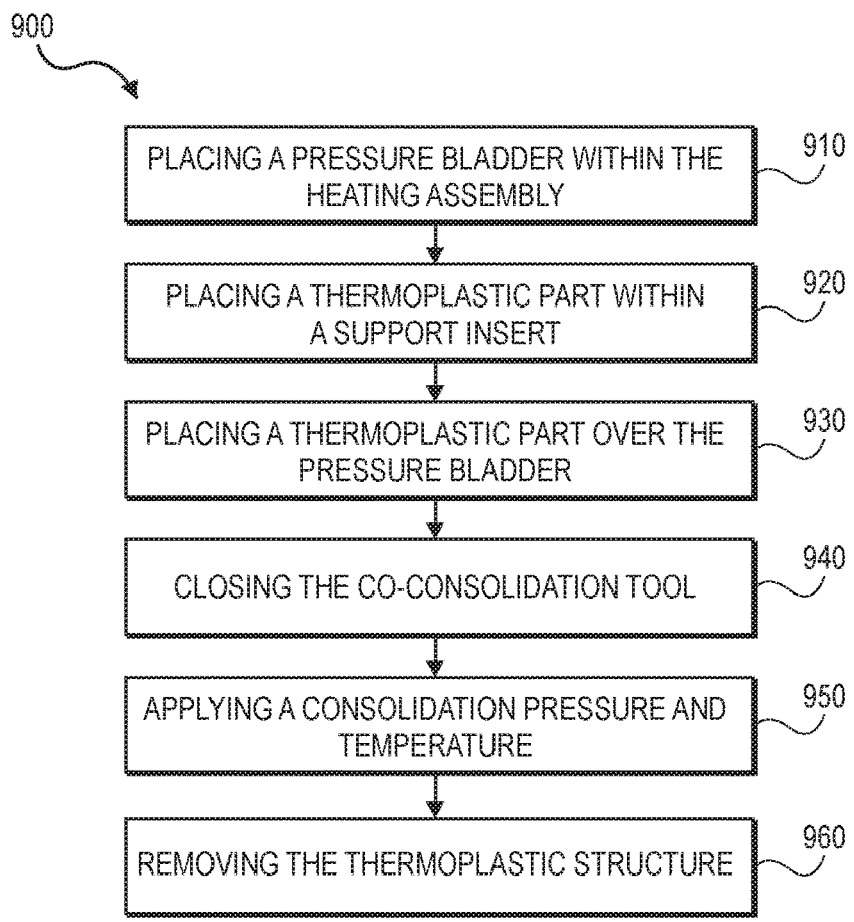
FIG. 8 illustrates a method for the co-consolidation of thermoplastic parts according to an implementation of the present disclosure.

FIGS. 5-7 illustrate a tool for the co-consolidation of thermoplastic parts according to an implementation of the present disclosure. FIG. 5 illustrates a co-consolidation tool 100 in an open position. FIG. 6 illustrates the co-consolidation tool 100 of FIG. 5 in a closed position. FIG. 7 illustrates a close-up view of the co-consolidation tool 100 of FIG. 6. FIG. 8 illustrates a method for the co-consolidation of thermoplastic parts according to an implementation of the present disclosure. As illustrated in FIG. 8, a method 900 for the co-consolidation of thermoplastic parts may be described with respect to the co-consolidation tool 100 of FIGS. 5-7.

A pressure bladder 300 may be placed within the heating assembly 200 in operation 910. For example, as illustrated in FIGS. 5-6, a pressure bladder 300 may be placed over a bottom heating surface 231 of a bottom heating assembly 201. In some implementations, the bottom heating assembly 201 and/or the bottom heating surface 231 may be shaped to retain the pressure bladder 300 in a predetermined position. For example, as illustrated in FIGS. 5-6, the bottom heating assembly 201 and/or the bottom heating surface 231 may include a recess area 254 configured to retain the pressure bladder 300 at a predetermined position within the heating assembly 200 when the co-consolidation tool 100 is in the closed position. At least one surface of the pressure bladder 300 may be contoured to define one or more cavities 336 each configured to receive a support insert 400.

In some implementations, the pressure bladder 300 may include pin or bolts and/or slots (not illustrated) to help secure the pressure bladder 300 within the co-consolidation tool 100.

In operation 920, a second thermoplastic part 502 may be placed within and/or supported by a support insert 400. For example, as illustrated in FIGS. 5-7, the second thermoplastic part 502 may be embodied as a plurality of open hat-shaped stringers 502 and each support insert 400 may include three complementary support inserts 401, 402, and 403. As illustrated in FIGS. 5-7, the complementary support inserts 401-403 may be placed within concave areas of the open hat-shaped stringer 502 to support and partially surround each open hat-shaped stringer 502. The support insert 400 may leave portions of each open hat-shaped stringer 502 free to contact at least one of the pressure bladder 300, the heating surfaces 230, and/or other thermoplastic parts 500. As described above, the second thermoplastic part 502 may also be embodied as a plurality of stringers 502 with (or a combination of) various intended profile shapes (e.g. hat, Z, C, L, etc.).

As illustrated in FIGS. 5-7, each support insert 400 may leave bottom surfaces 503 of each open hat-shaped stringer 502 free to contact a top surface 302 of the pressure bladder 300. Similarly, each support insert 400 may leave a top surface 504 of each open hat-shaped stringer 502 free to contact a contact surface 511 of a first thermoplastic part 501.

Each support insert 400, supporting and surrounding an open hat-shaped stringer 502, may be placed within a cavity 336 of a contoured pressure bladder 300, such that, when the co-consolidation tool 100 is in a closed position and/or the pressure bladder 300 is pressurized, each support insert 400 applies a compaction pressure to each open hat-shaped stringer 502.

A first thermoplastic part 501 may then be placed over the pressure bladder 300 and the support inserts 400 in operation 930. For example, as illustrated in FIGS. 5-7, the pressure bladder 300, the support inserts 400, and the top surfaces 504 of the open hat-shaped stringers 502 may be configured to create a support surface 700 to support placement of a first thermoplastic part 501. The first thermoplastic part 501 may be embodied as a half-barrel fuselage panel 501. The half-barrel fuselage panel 501 may be fully consolidated when placed on the support surface 700. Alternatively, the half-barrel fuselage panel 501 may be partially-consolidated when placed on the support surface 700. In some implementations, the half-barrel fuselage panel 501 may be formed directly on the support surface 700. For example, the half-barrel fuselage panel 501 may be formed on the support surface 700 via AFP, ATL, or the other thermoplastic forming methods described above.

In operation 940, the co-consolidation tool 100 is closed to allow the heating assembly 200 to heat the thermoplastic parts 500. For example, as illustrated in FIGS. 6-7, the co-consolidation tool 100 may be brought to a closed position to place top heating surface 232 in contact with (or in position to contact) the half-barrel fuselage panel 501. In some implementations, the pressure bladder 300 must be pressurized to bring the top heating surface 232 in contact with the half-barrel fuselage panel 501. In other implementations, closing the co-consolidation tool 100 brings the top heating surface 232 in contact with the half-barrel fuselage panel 501. For example, the pressure bladder 300 may be pressurized or at least partially pressurized before closing of the co-consolidation tool 100 to ensure contact by the top heating surface 232.

In one implementation, the heating assembly 200 includes a restraint lock 250 to secure the co-consolidation tool 100 in the closed position. For example, as illustrated in FIGS. 5-7, the restraint lock 250 may include one or more restraint pins 251 and 252. The restrain pins 251 and 252 are configured to fit within channels 241 and 242 of the bottom and top heating assemblies 201-202 and secured to form the restraint lock 250 to lock the bottom heating assembly and the top heating assembly 201-202 in a closed position during a co-consolidation operation or while a consolidation pressure and consolidation temperature are applied to the thermoplastic parts 500. For example, the one or more restraint pins 251 and 252 may be held together by claims. These clamps may be automatically moved into place by mechanical actuators and then the clamping mechanism may be hydraulically actuated. This hydraulic actuation may be sufficient to counteract a force developed by the pressure bladder 300 and maintain the co-consolidation tool 100 in the closed position.

A consolidation pressure and temperature is applied to the thermoplastic parts 500 in operation 950. For example, bottom heating surface 231 and top heating surface 232 may be heated (and cooled) according to a consolidation temperature after the co-consolidation tool 100 is in the closed position. The consolidation temperature is then applied to the open hat-shaped stringers 502 and the half-barrel fuselage panel 501 directly through contact with bottom heating surface 231 and top heating surface 232 or indirectly via conduction through the pressure bladder 300 and/or the support insert 400 which may both be thermally conductive. Similarly, the pressure bladder 300 may be pressurized to apply a consolidation pressure to the thermoplastic parts 500 during the co-consolidation operation.

Figure 9:
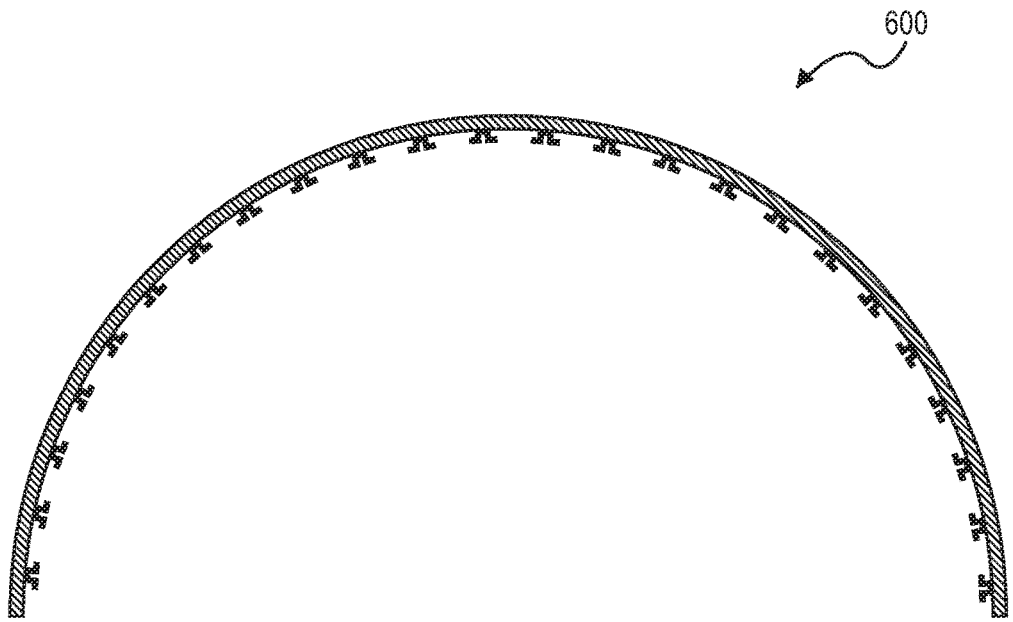
FIG. 9 illustrates a thermoplastic structure according to an implementation of the present disclosure.

In some implementations, each support insert 400 is configured to apply a compaction pressure to each open hat-shaped stringers 502 contained therein in response to the pressure applied by the pressurized pressure bladder 300 and/or the physical constraints resulting from placing each support insert 400 within a cavity 336 of the contoured pressure bladder 300. As the thermoplastic parts 500 are heated, compressed, and cooled down, the open hat-shaped stringers 502 and the half-barrel fuselage panel 501 may be consolidated into a thermoplastic structure 600. As illustrated in FIG. 9, the thermoplastic structure 600 may be embodied as a half-barrel fuselage panel with integrally formed open-hat stringers.

In operation 960, the thermoplastic structure 600 is removed from the co-consolidation tool 100. For example, co-consolidation tool 100 may be opened after the thermoplastic structure 600 reaches the desired cool-down temperature and the thermoplastic structure 600 is removed. The pressure bladder 300 may be de-pressurized before opening the co-consolidation tool 100 to help removal of the thermoplastic structure 600. For example, the pressure bladder 300 may be subject to a slight vacuum to help separate the thermoplastic structure 600 from the heating assembly 200. The complementary support inserts 401, 402, and 403 are then removed from around the open hat-shaped stringers of the thermoplastic structure 600. In some implementations, removable plugs 605 (not illustrated) may have been placed at ends of the open hat-shaped stringers 502 to facilitate removal of the thermoplastic structure 600 after consolidation.

Figure 10:
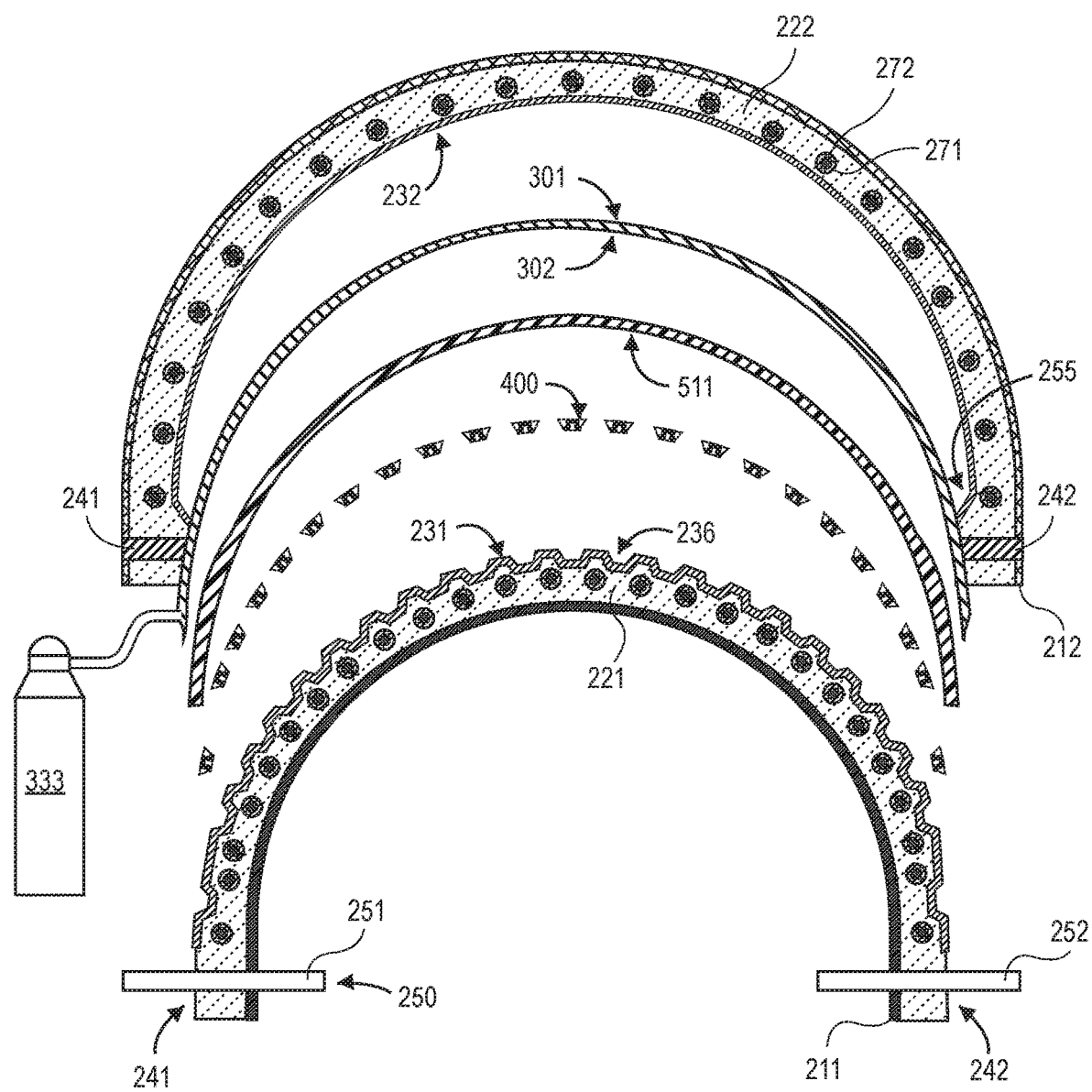
FIGS. 10-12 illustrate a tool for the co-consolidation of thermoplastic parts according to an implementation of the present disclosure.
Figure 11:
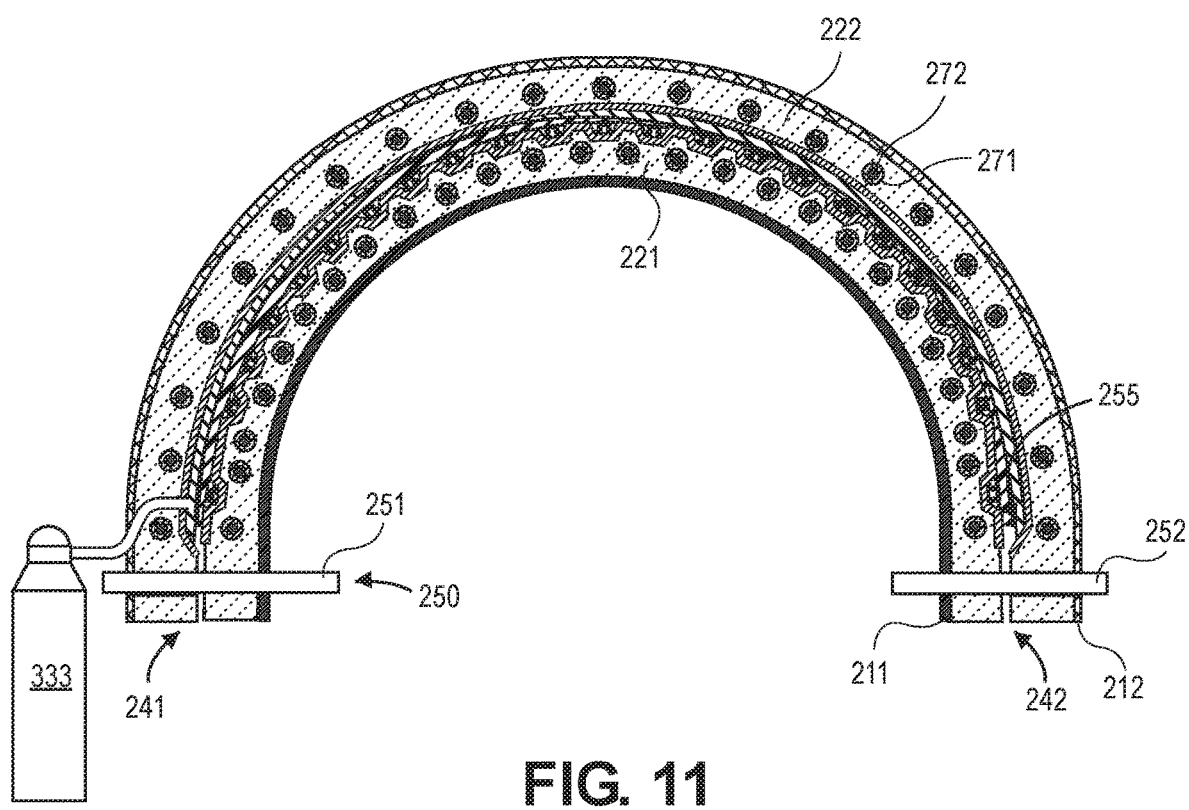
Figure 12:
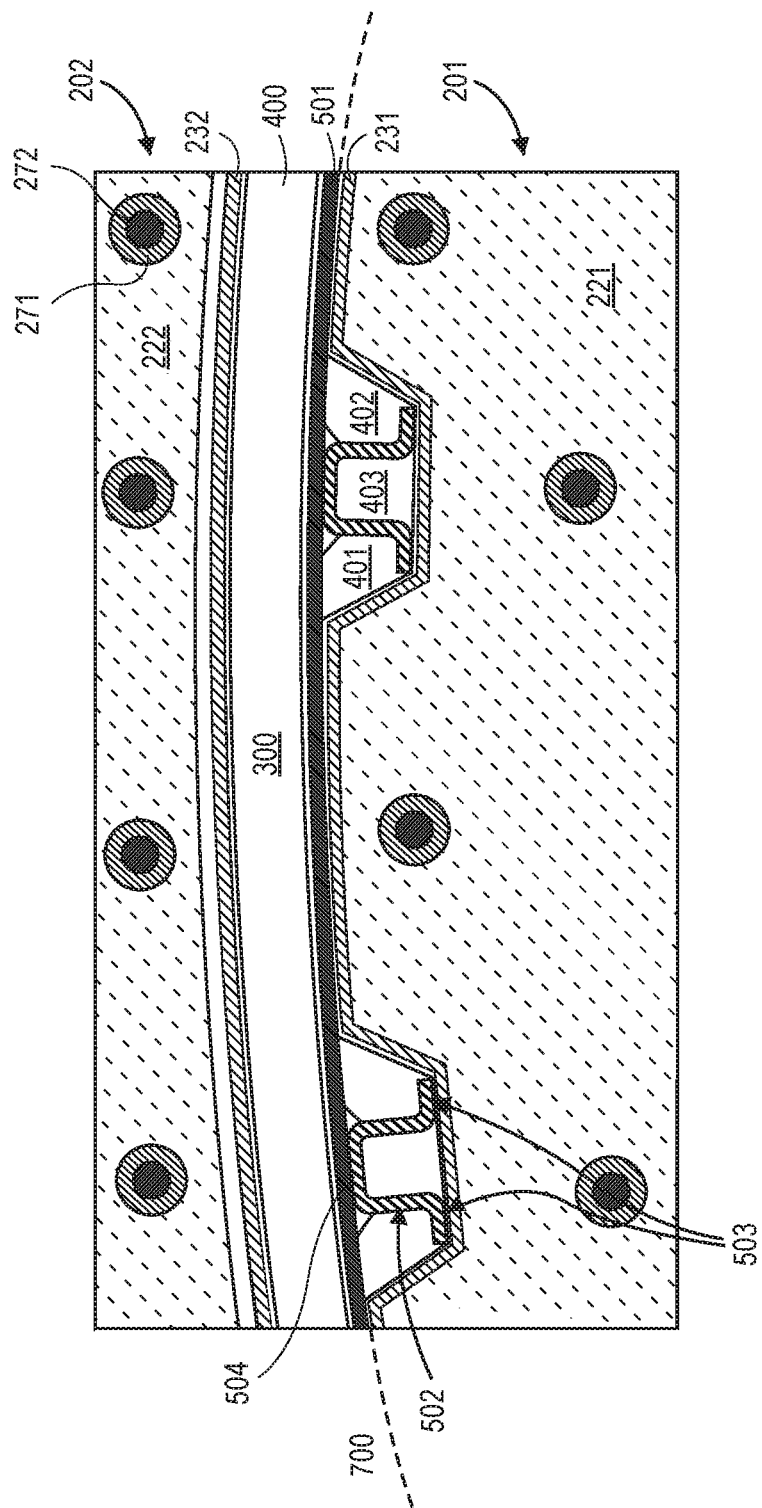
Figure 13:
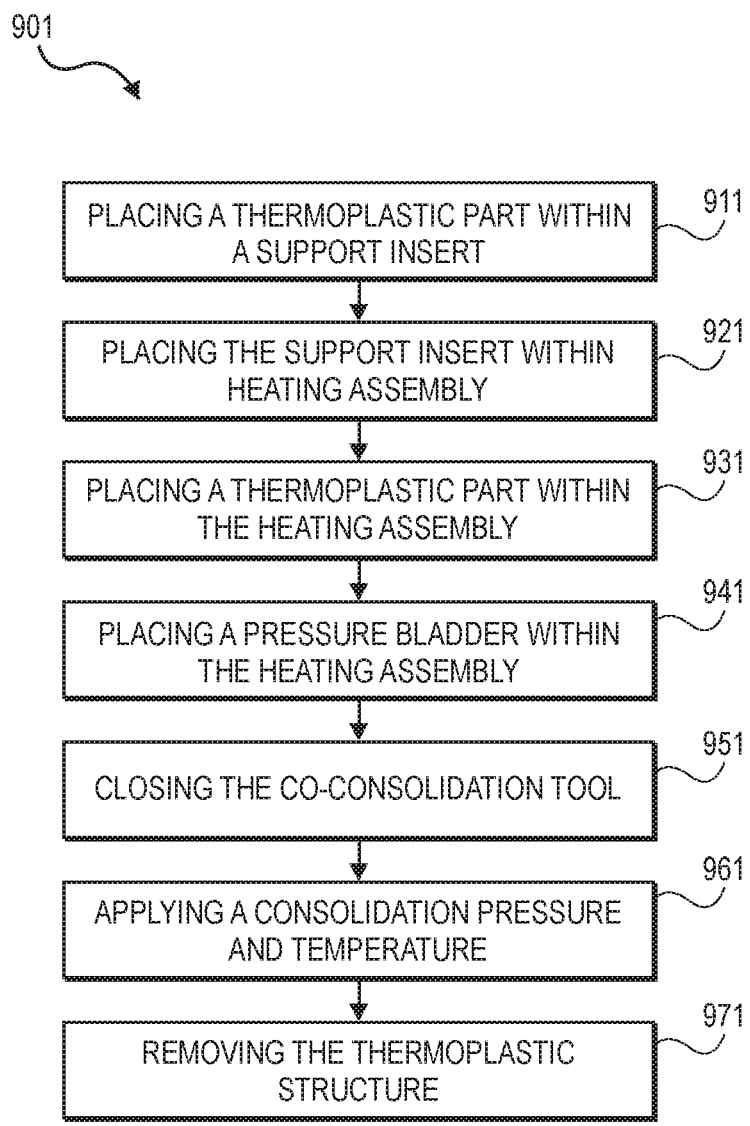
FIG. 13 illustrates a method for the co-consolidation of thermoplastic parts according to an implementation of the present disclosure.

FIGS. 10-12 illustrate a tool for the co-consolidation of thermoplastic parts according to an implementation of the present disclosure. FIG. 10 illustrates a co-consolidation tool 100 in an open position. FIG. 11 illustrates the co-consolidation tool 100 of FIG. 10 in a closed position. FIG. 12 illustrates a close-up view of the co-consolidation tool 100 of FIG. 11. FIG. 13 illustrates a method for the co-consolidation of thermoplastic parts according to an implementation of the present disclosure. As illustrated in FIG. 13, a method 901 for the co-consolidation of thermoplastic parts may be described with respect to the co-consolidation tool 100 of FIGS. 10-12.

In operation 911, a second thermoplastic part 502 may be placed within and/or supported by a support insert 400. For example, as illustrated in FIGS. 10-12, the second thermoplastic part 502 may be embodied as a plurality of open hat-shaped stringers 502 and each support insert 400 may include three complementary support inserts 401, 402, and 403 to support and partially surround each open hat-shaped stringers 502 as previously described above.

Each support insert 400, supporting and surrounding an open hat-shaped stringer 502, may then be placed within the heating assembly 200 in operation 921. For example, as illustrated in FIGS. 10-12, each support insert 400 is placed within a cavity 236 of a contoured bottom heating surface 231.

A first thermoplastic 501 may then be placed (or formed) in the heating assembly 200 in operation 931. For example, as illustrated in FIGS. 10-12 the bottom heating surface 231, the support inserts 400, and the top surfaces 504 of the open hat-shaped stringers 502 may be configured to create a support surface 700 to support placement of the first thermoplastic part 501 within the heating assembly 200. The first thermoplastic part 501 may be fully consolidated when placed on the support surface 700 or may be formed directly on the support surface 700 as described above. The first thermoplastic part 501 may be embodied as a half-barrel fuselage panel 501.

In operation 941, a pressure bladder 300 is placed within the heating assembly 200. For example, as illustrated in FIGS. 10-12, the pressure bladder 300 may be placed over the half-barrel fuselage panel 501. In some implementations, the top heating assembly 202 and/or the top heating surface 232 may be shaped to retain the pressure bladder 300 in a predetermined position. For example, as illustrated in FIGS. 10-11, the top heating assembly 202 and/or the top heating surface 232 may include a recess area 255 configured to retain the pressure bladder 300 at a predetermined position within the heating assembly 200.

In operation 951, the co-consolidation tool 100 is closed to allow the heating assembly 200 to heat the thermoplastic parts 500. For example, as illustrated in FIGS. 11-12, the co-consolidation tool 100 may be brought to a closed position to place the top heating surface 232 in contact with (or in position to contact) the pressure bladder 300. In some implementations, the pressure bladder 300 must be pressurized to bring the top heating surface 232 in contact with the pressure bladder 300. In other implementations, closing the co-consolidation tool 100 brings the top heating surface 232 in contact with the pressure bladder 300. For example, the pressure bladder 300 may be pressurized before closing of the co-consolidation tool 100 to ensure contact by the top heating surface 232. The pressure bladder 300 may be thermally conductive so as to transmit a heat generated by the top heating surface 232 to the half-barrel fuselage panel 501. Similarly, the support inserts 400 may also be thermally conductive so as to transmit a heat generated by the bottom heating surface 231 to the open hat-shaped stringers 502.

In operation 961, a consolidation pressure is applied by the pressure bladder 300 and a consolidation temperature is applied by the heating assembly 200 to the thermoplastic parts 500 similarly as described above. In some implementations, the consolidation temperature applied by the heating assembly 200 may vary as a function in time as illustrated in FIG. 3. As the thermoplastic parts 500 are heated and compressed according to the consolidation temperature and the consolidation pressure, the thermoplastic parts 500 may be consolidated into a thermoplastic structure 600. For example, the thermoplastic structure 600 may be embodied as a thermoplastic half-barrel fuselage panel with integrally formed open hat-shaped stringers as illustrated in FIG. 9.

In operation 971, the consolidated thermoplastic structure 600 is removed from the co-consolidation tool 100. For example, the co-consolidation tool 100 may be opened after the thermoplastic structure 600 reaches the desired cool-down temperature and the thermoplastic structure 600 may be removed as described above.

Figure 14:
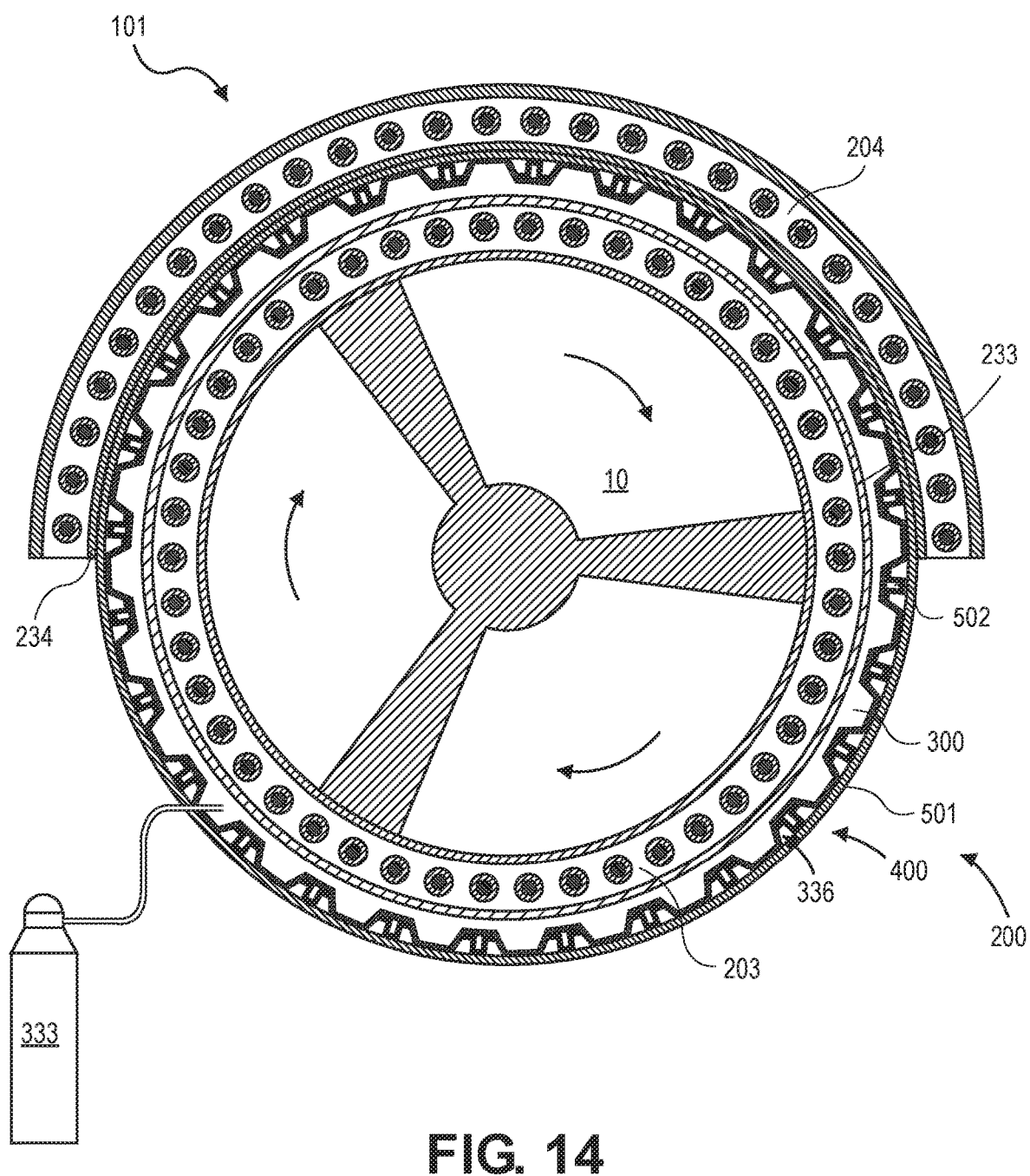
FIGS. 14-16 illustrate a tool for the co-consolidation of thermoplastic parts according to an implementation of the present disclosure.
Figure 15:
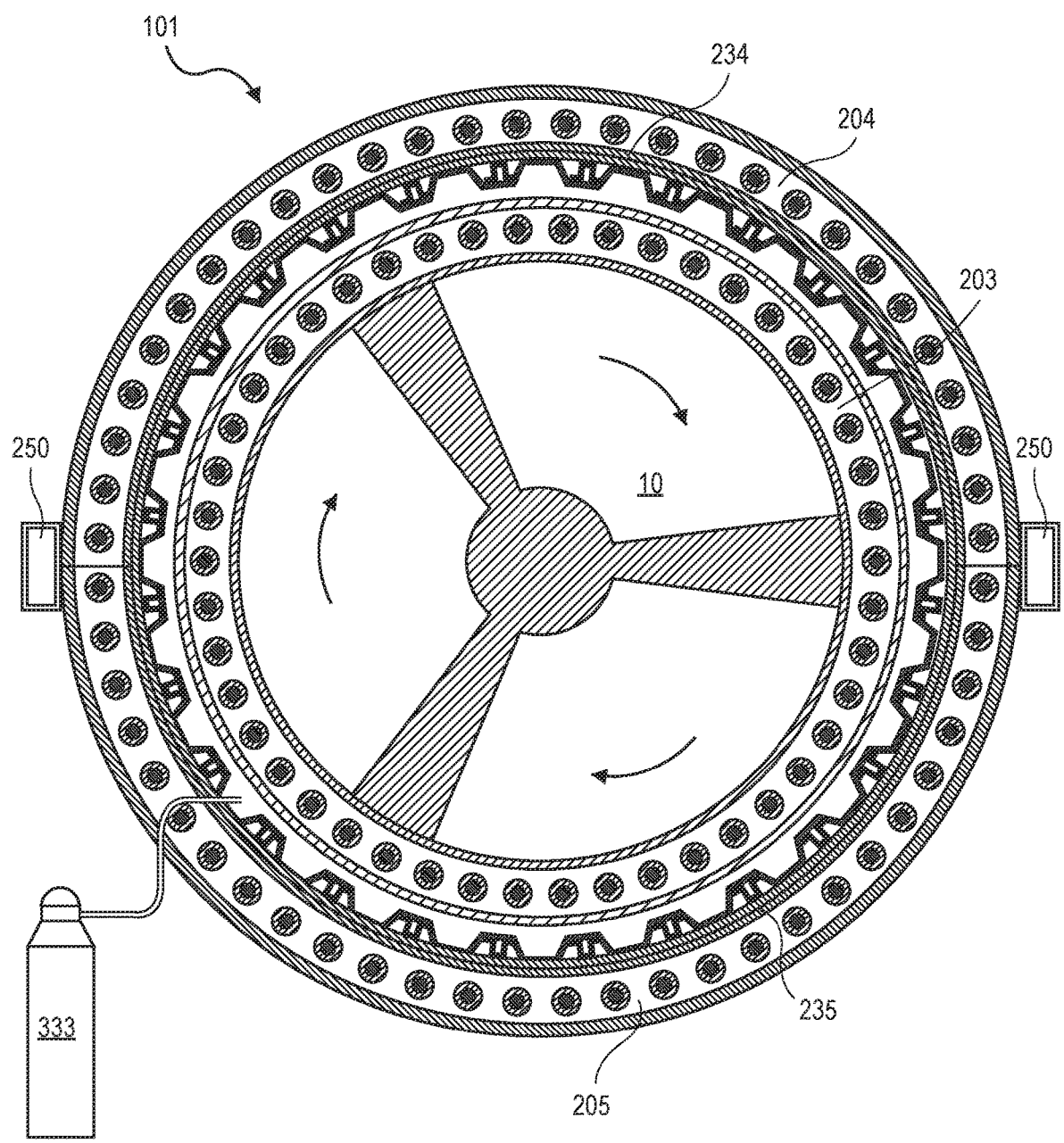
Figure 16:
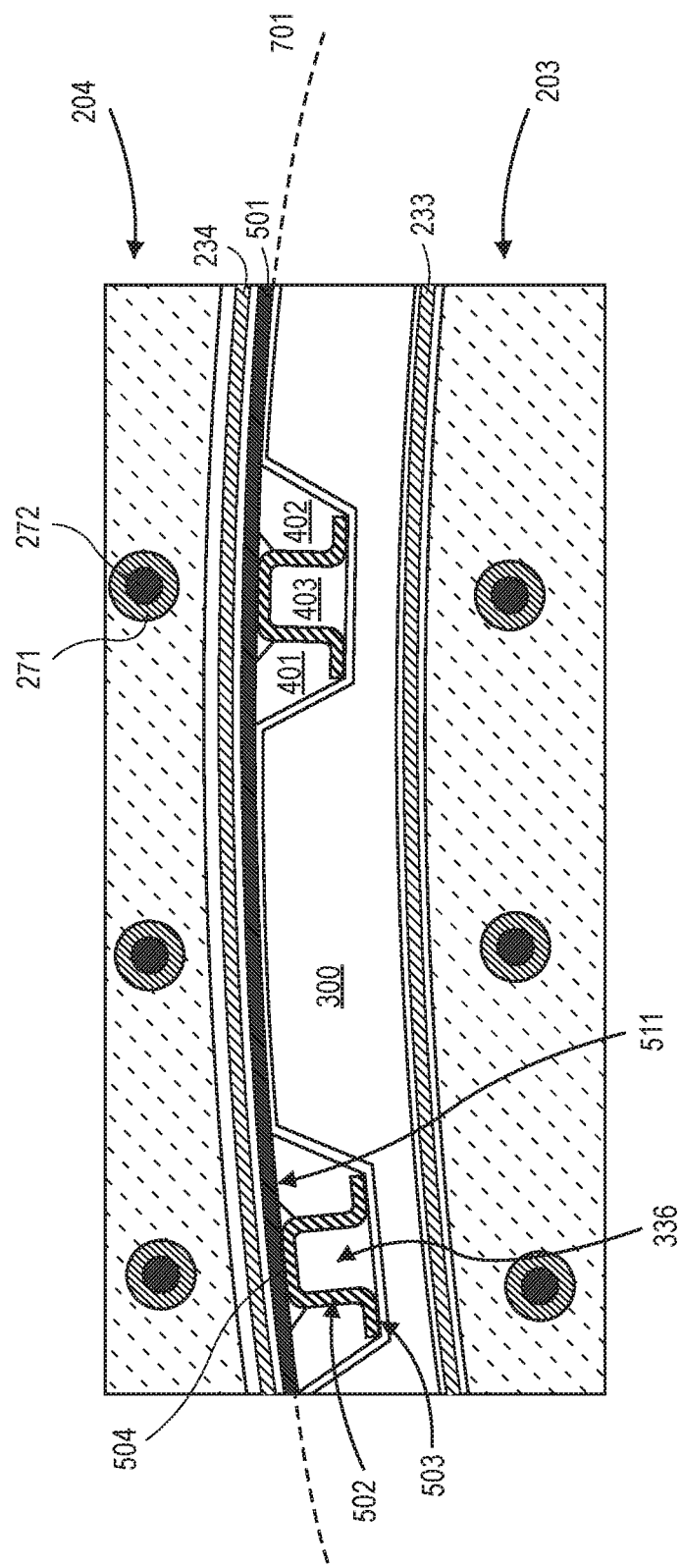

FIGS. 14-15 illustrate a tool for the co-consolidation of thermoplastic parts according to an implementation of the present disclosure. FIG. 14 illustrates a co-consolidation tool 101 in a partially open position. FIG. 15 illustrates the co-consolidation tool 101 of FIG. 14 in a closed position. FIG. 16 illustrates a close-up view of the co-consolidation tool 101 of FIGS. 14-156.

While co-consolidation tool 101 of FIGS. 14-16 is similar to the co-consolidation tool 100 of the implementations described above, with the same reference numerals used for same or similar components and structures, co-consolidation tool 101 has been modified to accommodate full barrel-shaped thermoplastic bodies. In particular, as illustrated in FIGS. 14-16, the heating assembly 200 may include a central heating assembly 203, a top heating assembly 204, and a bottom heating assembly 205. The central heating assembly 203 may be disposed over a mandrel 10. As described in more detail below, in some implementations, the mandrel 10 is configured to rotate around a longitudinal axis to facilitate placement of one or more of the thermoplastic parts 500.

Figure 17:
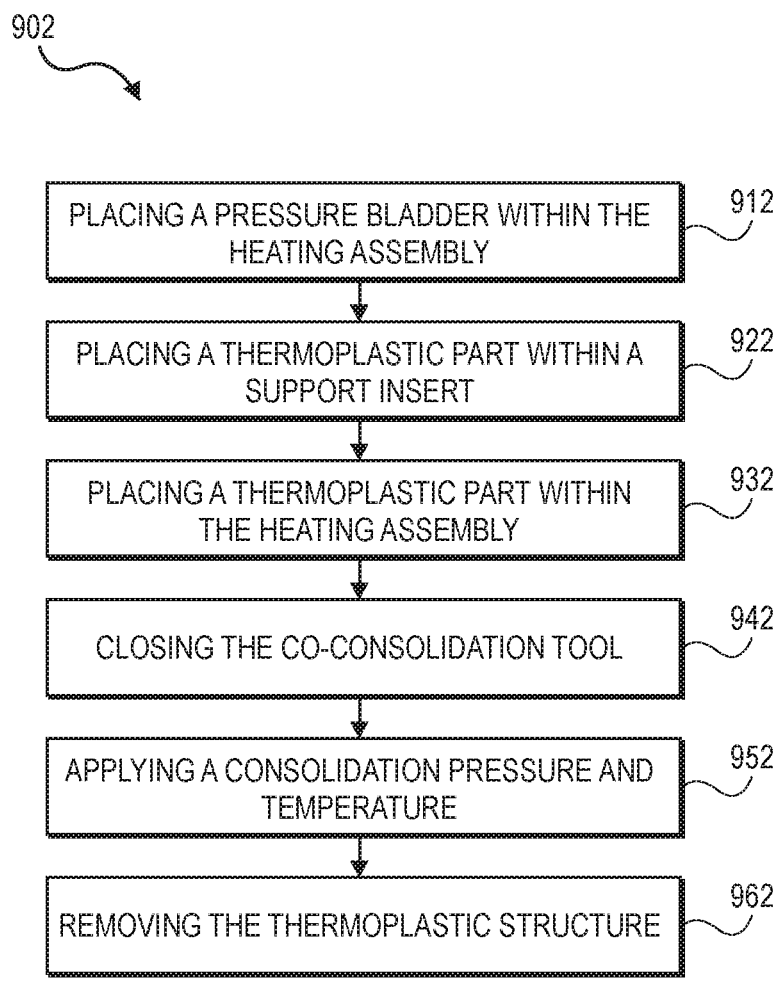
FIG. 17 illustrates a method for the co-consolidation of thermoplastic parts according to an implementation of the present disclosure.

FIG. 17 illustrates a method for the co-consolidation of thermoplastic parts according to an implementation of the present disclosure. As illustrated in FIG. 17, a method 902 for the co-consolidation of thermoplastic parts may be described with respect to the co-consolidation tool 101 of FIGS. 14-16.

A pressure bladder 300 may be placed within the heating assembly 200 in operation 912. For example, as illustrated in FIGS. 14-16, a pressure bladder 300 may be placed over a central heating surface 233 of the central heating assembly 203. In some implementations, the pressure bladder 300 may be configured as a sleeve fitting over the central heating surface 233 and the central heating assembly 203.

At least one surface of the pressure bladder 300 may be contoured to define one or more cavities 336 each configured to receive a support insert 400.

In operation 922, a second thermoplastic part 502 may be placed within and/or supported by a support insert 400 as described above. As illustrated in FIGS. 14-16, each support insert 400 may leave bottom surfaces 503 of each open hat-shaped stringer 502 free to contact a top surface 302 of the pressure bladder 300. Similarly, each support insert 400 may leave a top surface 504 of each open hat-shaped stringer 502 free to contact a contact surface 511 of a first thermoplastic part 501. Each support insert 400, supporting and surrounding an open hat-shaped stringer 502, may be placed within a cavity 336 of a contoured pressure bladder 300, such that, when the co-consolidation tool 101 is in a closed position and/or the pressure bladder 300 is pressurized, each support insert 400 applies a compaction pressure to each open hat-shaped stringer 502.

A first thermoplastic part 501 may then be placed over the pressure bladder 300 and the support inserts 400 in operation 932. For example, as illustrated in FIGS. 14-16, the pressure bladder 300, the support inserts 400, and the top surfaces 504 of the open hat-shaped stringers 502 may be configured to create a support surface 701 to support placement of a first thermoplastic part 501.

The first thermoplastic part 501 may be embodied as a fuselage barrel 501. The fuselage barrel 501 may be fully consolidated when placed on the support surface 701. Alternatively, the fuselage barrel 501 may be partially-consolidated when placed on the support surface 701. In some implementations, the fuselage barrel 501 may be formed directly on the support surface 701. For example, the fuselage barrel 501 may be formed on the support surface 701 via AFP, ATL, or the other thermoplastic forming methods described above. In some implementations, the support surface 701 is rotated to facility a formation of the fuselage barrel 501 on the support surface 701. For example, as described above, the central heating assembly 203 supports the pressure bladder 300 and the support inserts 400. As the central heating assembly 203 is rotated by the mandrel 10 is rotated, the support surface 701 also rotated to facilitate the forming of the fuselage barrel 501, for example, by AFP, ATL, or the other thermoplastic forming methods described above.

In operation 942, the co-consolidation tool 100 is closed to allow the heating assembly 200 to heat the thermoplastic parts 500. For example, as illustrated in FIGS. 14-16, the co-consolidation tool 100 may be brought to a closed position by placing top and bottom heating assemblies 204-205 around the central heating assembly 203 and bringing a top heating surface 234 and a bottom heating surface 235 in contact with (or in position to contact) the fuselage barrel 501. In some implementations, the pressure bladder 300 must be pressurized to bring the top and bottom heating surface 234-235 in contact with the fuselage barrel 501. In other implementations, the pressure bladder 300 may be pressurized or at least partially pressurized before closing of the co-consolidation tool 100 to ensure contact by the top and bottom heating surface 234-235.

The heating assembly 200 may include restraint locks 250 to secure the co-consolidation tool 100 in the closed position. For example, as illustrated in FIG. 16, the restraint locks 250 lock the top and bottom heating assemblies 204-205 around the central heating assembly 203 in a closed position during a co-consolidation operation or while a consolidation pressure and consolidation temperature are applied to the thermoplastic parts 500.

Figure 18:
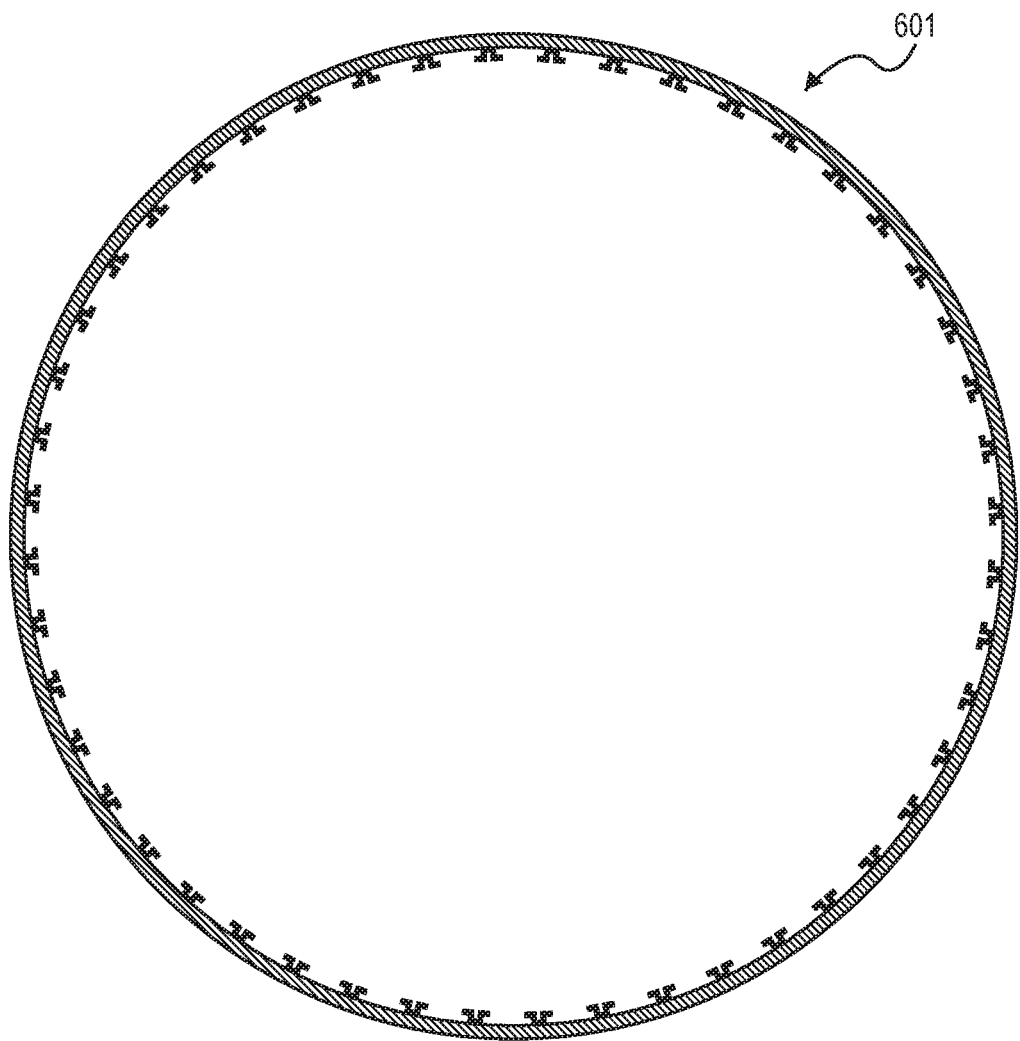
FIG. 18 illustrates a thermoplastic structure according to an implementation of the present disclosure.

In operation 952, a consolidation pressure is applied by the pressure bladder 300 and a consolidation temperature is applied by the heating assembly 200 to the thermoplastic parts 500 similarly as described above. In some implementations, the consolidation temperature applied by the heating assembly 200 may vary as a function in time as illustrated in FIG. 3. As the thermoplastic parts 500 are heated and compressed according to the consolidation temperature and the consolidation pressure, the thermoplastic parts 500 may be consolidated into a thermoplastic structure 601. For example, the thermoplastic structure 601 may be embodied as a thermoplastic fuselage barrel with integrally formed open hat-shaped stringers as illustrated in FIG. 18.

In operation 962, the consolidated thermoplastic structure 601 is removed from the co-consolidation tool 101. For example, the top heating assembly 204 and the bottom heating assembly 205 may be removed to expose thermoplastic structure 601 formed over the central heating assembly 203 after the thermoplastic structure 601 reaches a desired cool-down temperature.

In some implementations, the pressure bladder 300 may be subject to a vacuum or may be partially de-pressurized to facility removal of the thermoplastic structure 601

In some implementations, removable plugs 605 (not illustrated) may be placed at ends of the open hat-shaped stringers 502 to facilitate removal of the thermoplastic structure 600 after consolidation.

Figure 19:
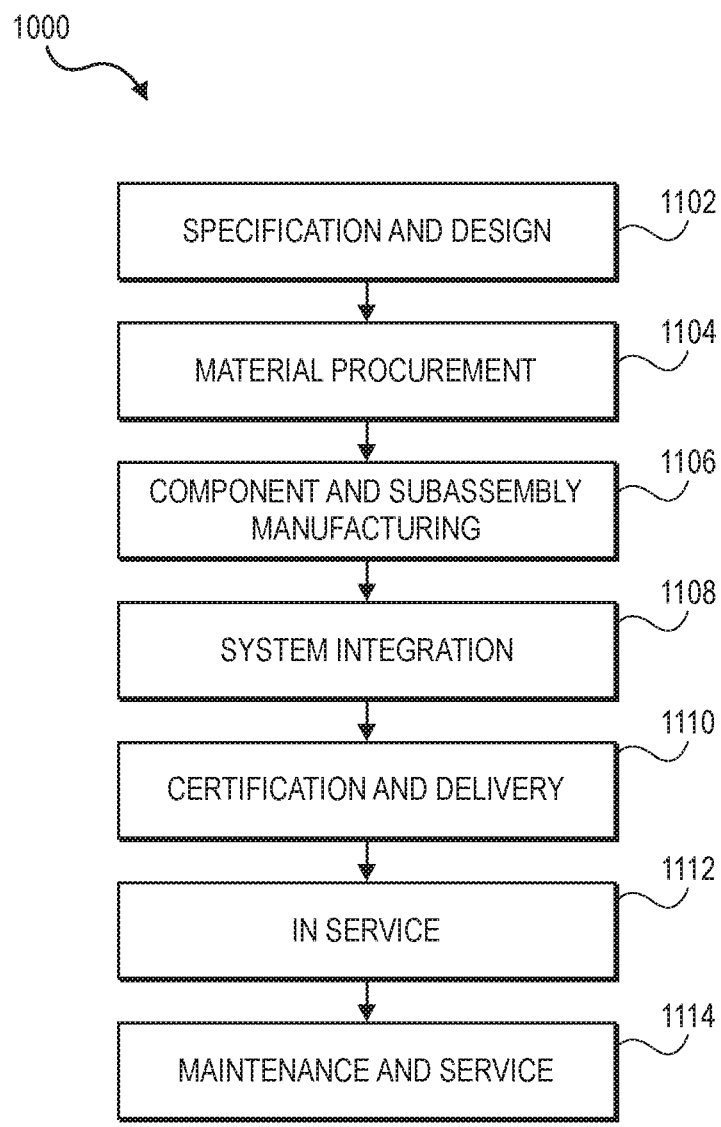
FIG. 19 illustrates a flow diagram of aircraft production and service methodology.
Figure 20:
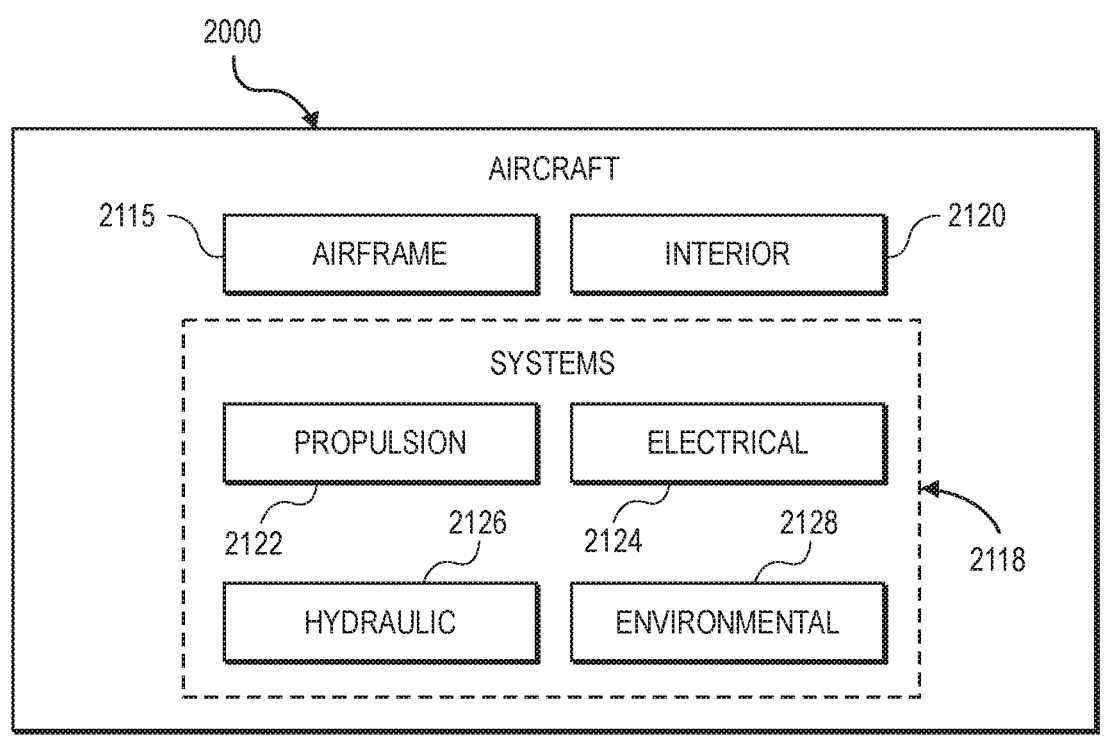
FIG. 20 illustrates a block diagram of an aircraft.

Implementations of the disclosure may find use in a variety of potential applications, particularly in the transportation industry, including for example, aerospace, marine, automotive applications, and other application where formation and consolidation of thermoplastic parts and structures are carried out. Thus, referring now to FIGS. 19 and 20, implementations of the disclosure may be used in the context of an aircraft manufacturing and service method 1000 as shown in FIG. 19 and an aircraft 2000 as shown in FIG. 20. During pre-production, exemplary method 1000 may include specification and design 1102 of the aircraft 2000 and material procurement 1104. During production, component and subassembly manufacturing 1106 and system integration 1108 of the aircraft 2000 takes place. Thereafter, the aircraft 2000 may go through certification and delivery 1110 in order to be placed in service 1112. While in service by a customer, the aircraft 2000 is scheduled for routine maintenance and service 1114, which may also include modification, reconfiguration, refurbishment, and so on.

Each of the processes of method 1000 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 20, the aircraft 2000 produced by exemplary method 1000 may include an airframe 2116 with a plurality of systems 2118 and an interior 2120. Examples of high-level systems 2118 include one or more of a propulsion system 2122, an electrical system 2124, a hydraulic system 2126, and an environmental system 2128. Any number of other systems may be included. Although an aerospace example is shown, the principles of the disclosure may be applied to other industries, such as the marine and automotive industries.

Systems and methods embodied herein may be employed during any one or more of the stages of the production and service method 1000. For example, components or subassemblies corresponding to production process 1106 may be fabricated or manufactured in a manner similar to components or subassemblies produced while the aircraft 2000 is in service. Also, one or more apparatus embodiments, method embodiments, or a combination thereof may be utilized during the production stages 1106 and the 1108, for example, by substantially expediting assembly of or reducing the cost of an aircraft 2000. Similarly, one or more of apparatus embodiments, method embodiments, or a combination thereof may be utilized while the aircraft 2000 is in service, for example and without limitation, to maintenance and service 1114.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," "bottom," and "under" are defined with respect to the conventional plane or working surface being on the top surface of the workpiece, regardless of the orientation of the workpiece.

It is intended that the specification and examples be considered as exemplary only, with a true scope and spirit of the present teachings being indicated by the following claims.

What is claimed is:

1. A co-consolidation tool to form a thermoplastic fuselage skin with integrally formed thermoplastic stiffening elements, comprising:
   a heating assembly, comprising one or more heating surfaces, to receive and apply a consolidation temperature to a thermoplastic fuselage skin and one or more thermoplastic stiffening elements;
   a pressure bladder, disposed within the heating assembly, to apply a consolidation pressure to the thermoplastic fuselage skin and the one or more thermoplastic stiffening elements; and
   a plurality of support inserts, disposed within the heating assembly, to support and at least partially surround the one or more thermoplastic stiffening elements,
   wherein the pressure bladder and the plurality of support inserts are thermally conductive.

2. The co-consolidation tool of claim 1,
   wherein the pressure bladder is configured to press the thermoplastic fuselage skin and the one or more thermoplastic stiffening elements together when the pressure bladder is pressurized, and
   wherein the pressure bladder is configured to press the thermoplastic fuselage skin and the one or more thermoplastic stiffening elements in contact with at least one of the one or more heating surfaces when the pressure bladder is pressurized.

3. The co-consolidation tool of claim 2, wherein the plurality of support inserts apply a compaction pressure to one of the one or more thermoplastic stiffening elements within the support inserts when the pressure bladder is pressurized.

4. The co-consolidation tool of claim 2,
   wherein the pressure bladder comprises a plurality of cavities shaped to receive and support the plurality of support inserts, and
   wherein, when the pressure bladder is pressurized, the plurality of support inserts apply a compaction pressure to one of the one or more thermoplastic stiffening elements contained therewithin in response to the consolidation pressure applied by the pressurized pressure bladder and physical constraints of said plurality of cavities.

5. The co-consolidation tool of claim 4,
   wherein, when placed within the heating assembly, the pressure bladder, the plurality of thermally conductive support inserts, and the one or more thermoplastic stiffening elements, define a support surface configured to support the thermoplastic fuselage skin within the heating assembly.

6. The co-consolidation tool of claim 3,
   wherein at least one of the one or more heating surfaces comprises a plurality of cavities shaped to receive and support the plurality of support inserts, and
   wherein, when the pressure bladder is pressurized, the plurality of support inserts apply a compaction pressure to one of the one or more thermoplastic stiffening elements contained therewithin in response to the consolidation pressure applied by the pressurized pressure bladder and physical constraints of said plurality of cavities.

7. The co-consolidation tool of claim 6,
when placed within the heating assembly, the plurality of thermally conductive support inserts and the one or more thermoplastic stiffening elements together with a top surface of the at least one of the one or more heating surfaces comprising a plurality of cavities define a support surface configured to support the thermoplastic fuselage skin within the heating assembly.

8. The co-consolidation tool of claim 3, further comprising a rotating mandrel,
wherein at least one of the one or more heating surfaces is supported by the rotating mandrel.

9. The co-consolidation tool of claim 1, wherein the heating assembly comprises one or more heating bodies.

10. The co-consolidation tool of claim 9, wherein the one or more heating bodies are configured to generate a magnetic field for induction heating.

11. The co-consolidation tool of claim 10, wherein the one or more heating bodies comprise a plurality of induction coils and coolant channels.

12. The co-consolidation tool of claim 11, wherein at least one of the one or more heating bodies comprises a contoured surface configured to accommodate at least one of the plurality of thermally conductive support inserts.

13. The co-consolidation tool of claim 10, wherein at least one of the one or more heating surfaces comprises a smart susceptor to generate heat according to the magnetic field generated by the one or more heating bodies.

14. The co-consolidation tool of claim 1, wherein at least one of the one or more heating surfaces comprises a contoured surface configured to accommodate at least one of the plurality of thermally conductive support inserts.

15. The co-consolidation tool of claim 1, wherein each of the plurality of support inserts comprises one or more complementary support inserts.

16. The co-consolidation tool of claim 1, wherein the pressure bladder is a pneumatic pressure bladder.

17. The co-consolidation tool of claim 1, wherein the pressure bladder applies a consolidation pressure of up to 300 psi.

18. The co-consolidation tool of claim 1, wherein the pressure bladder is thermally stable up to 750° F.

19. The co-consolidation tool of claim 1, wherein the pressure bladder is a metallic pressure bladder comprising one or more metallic sheets.

20. The co-consolidation tool of claim 1, wherein the pressure bladder comprises at least one of aluminum or an aluminum alloy.

* * * * *